US011713561B2

(12) United States Patent
Kitagawa et al.

(10) Patent No.: US 11,713,561 B2
(45) Date of Patent: Aug. 1, 2023

(54) WATER TREATMENT SYSTEM

(71) Applicant: WOTA CORP., Tokyo (JP)

(72) Inventors: Riki Kitagawa, Tokyo (JP); Shohei Okudera, Tokyo (JP); Manabu Nishio, Tokyo (JP); Ryo Yamada, Tokyo (JP)

(73) Assignee: WOTA CORP., Tokyo (JP)

( * ) Notice: Subject to any disclaimer, the term of this patent is extended or adjusted under 35 U.S.C. 154(b) by 405 days.

(21) Appl. No.: 16/648,954

(22) PCT Filed: Sep. 20, 2018

(86) PCT No.: PCT/JP2018/034909
§ 371 (c)(1),
(2) Date: Mar. 19, 2020

(87) PCT Pub. No.: WO2019/059309
PCT Pub. Date: Mar. 28, 2019

(65) Prior Publication Data
US 2020/0256041 A1 Aug. 13, 2020

(30) Foreign Application Priority Data
Sep. 20, 2017 (JP) ................................ 2017-180580

(51) Int. Cl.
*E03B 1/04* (2006.01)
*A47K 3/28* (2006.01)
(Continued)

(52) U.S. Cl.
CPC ................ *E03B 1/041* (2013.01); *A47K 3/28* (2013.01); *C02F 1/004* (2013.01); *C02F 1/008* (2013.01);
(Continued)

(58) Field of Classification Search
None
See application file for complete search history.

(56) References Cited

U.S. PATENT DOCUMENTS 6,470,512 B1 10/2002 Lau et al.
2012/0192965 A1 8/2012 Popper et al.
(Continued)

FOREIGN PATENT DOCUMENTS

JP H11-010177 A 1/1999
JP 2001-191866 A 7/2001
(Continued)

OTHER PUBLICATIONS

An Office Action mailed by the Japanese Patent Office dated Jun. 9, 2020, which corresponds to Japanese Patent Application No. 2019-543709 and is related to U.S. Appl. No. 16/648,954; with concise English explanation.
(Continued)

*Primary Examiner* — Richard C Gurtowski
(74) *Attorney, Agent, or Firm* — Studebaker & Brackett PC

(57) ABSTRACT

Providing a water treatment system with which it is possible to efficiently share a plurality of water utilization means including a shower, and with which it is possible to use drain water in environments in which it is difficult to secure water. The water treatment system containing shower stalls which, when input water is used by a user, output the used water as drain water, wherein treated water sensors are capable of detecting a given physical amount, or an amount based thereon, pertaining to at least a portion among the water input to each information processing device controlling the shower stalls and the drain water output from each of the shower stalls. An information generation unit generates information pertaining to the use by a user of each of the shower stalls based on at least a portion of the results from the treated water sensors.

7 Claims, 21 Drawing Sheets

(51) Int. Cl.
*C02F 1/00*       (2023.01)
*G05B 15/02*      (2006.01)
*H04Q 9/00*       (2006.01)
C02F 103/42       (2006.01)
G06Q 50/06        (2012.01)

(52) U.S. Cl.
CPC ............ *G05B 15/02* (2013.01); *H04Q 9/00* (2013.01); *C02F 2103/42* (2013.01); *C02F 2301/046* (2013.01); *E03B 2001/045* (2013.01); *G06Q 50/06* (2013.01); *H04Q 2209/40* (2013.01)

(56)          References Cited

U.S. PATENT DOCUMENTS

| | | |
|---|---|---|
| 2014/0053909 A1 | 2/2014 | Savage |
| 2017/0145669 A1 | 5/2017 | Klicpera et al. |
| 2017/0226720 A1 | 8/2017 | Mahdjoubi Namin et al. |

FOREIGN PATENT DOCUMENTS

| | | |
|---|---|---|
| JP | 2012-524848 A | 10/2012 |
| JP | 2015-107464 A | 6/2015 |
| JP | 2017-021713 A | 1/2017 |
| WO | 2004/101902 A1 | 11/2004 |

OTHER PUBLICATIONS

International Search Report issued in PCT/JP2018/034909; dated Jan. 15, 2019.

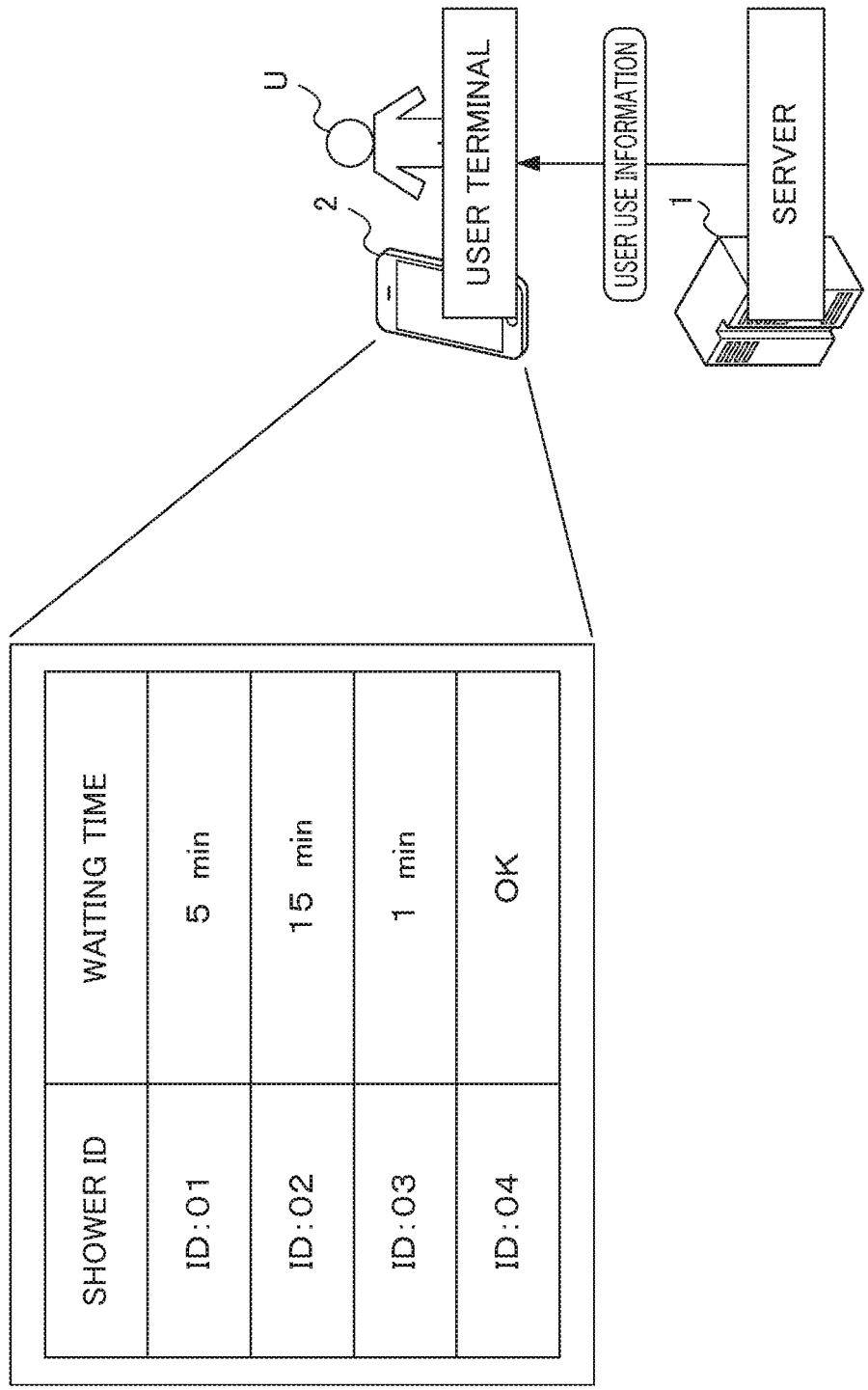

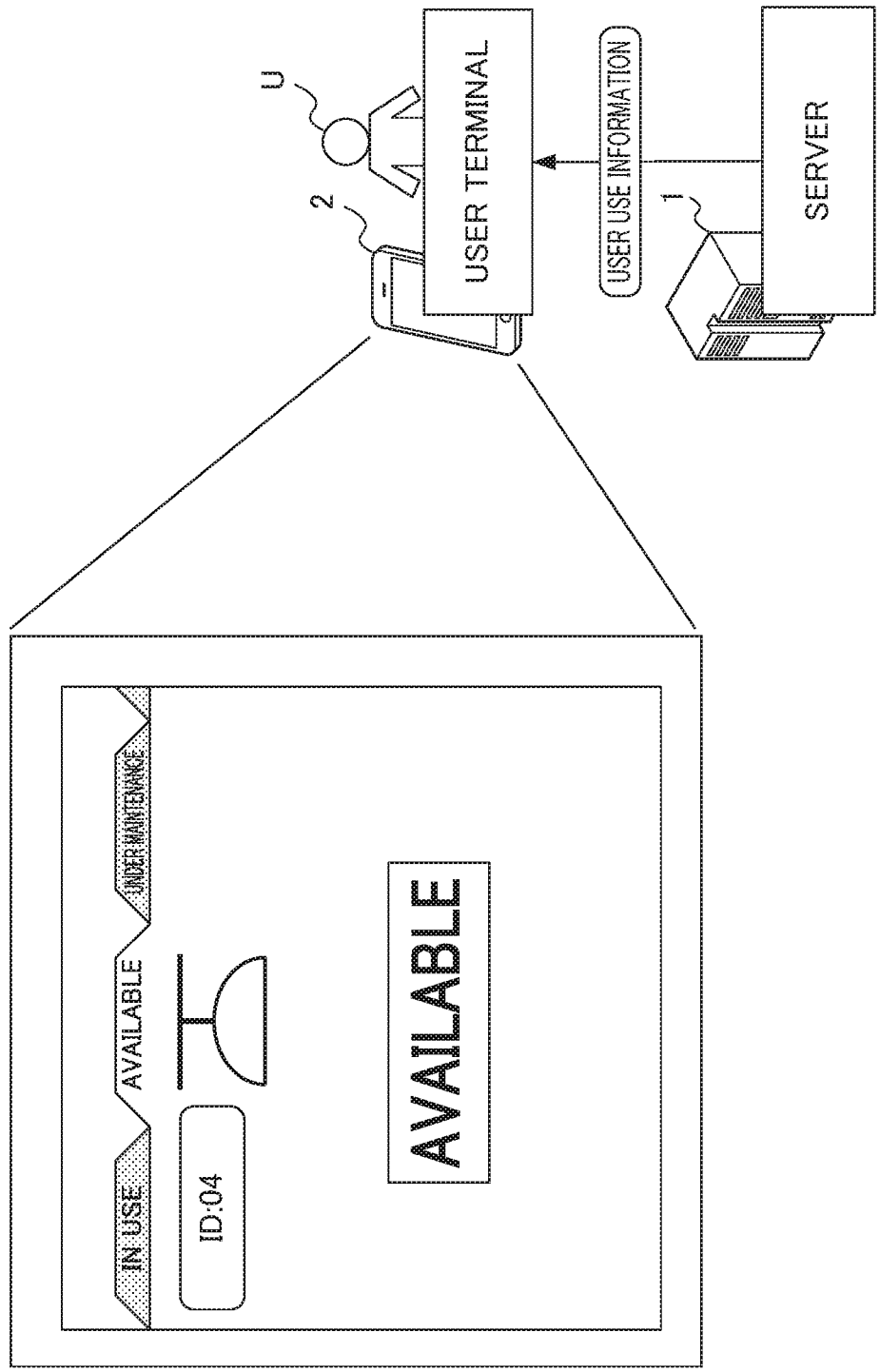

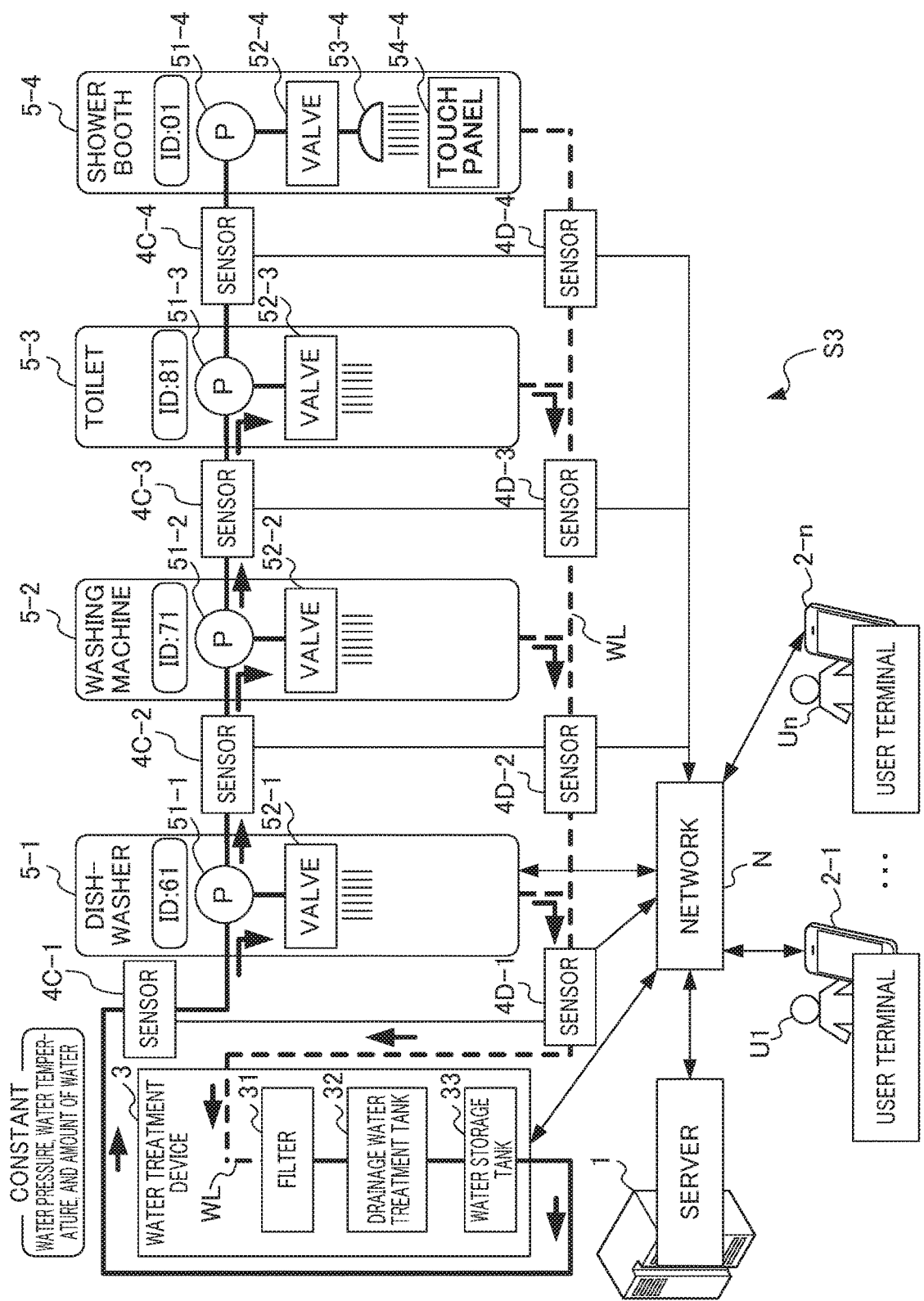

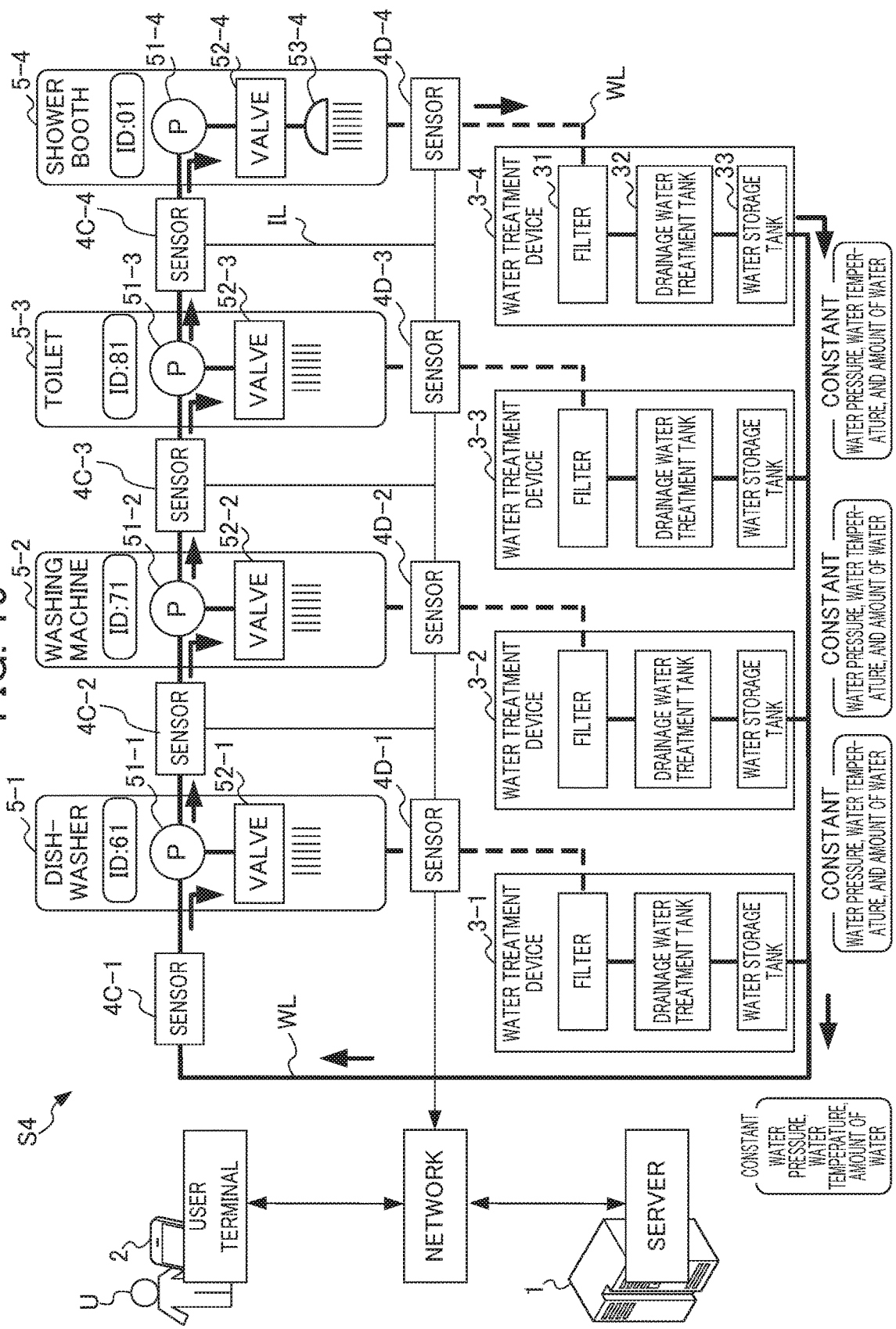

WATER TREATMENT SYSTEM

TECHNICAL FIELD

The present invention relates to a water treatment system.

BACKGROUND ART

Conventionally, there has been proposed a technique relevant to a shower facility in which a shower booth can be efficiently shared with a minimum space (for example, Patent Document 1).

Patent Document 1: Japanese Unexamined Patent Application, Publication No. 2001-191866

DISCLOSURE OF THE INVENTION

Problems to be Solved by the Invention

However, the conventional techniques including the technique described in the above Patent Document 1 are shower facilities capable of increasing the use efficiency of one shower booth, but are insufficient for sharing by a larger number of people. In addition, there is a demand not only for shower facilities but also for efficient sharing of a device for using and draining water (hereinafter, "water utilization device"). In addition, in an environment in which it is difficult to secure water, there is a demand to reuse drainage water as water to be used in the water utilization device.

The present invention has been made in view of such a situation, and it is an object of the present invention to provide a water treatment system by which it is possible to efficiently share a plurality of water utilization units including a shower and it is possible to use drainage water even in an environment in which it is difficult to secure water.

Means for Solving the Problems

In order to achieve the aforementioned object, a water treatment system according to an aspect of the present invention is a water treatment system including an information processing device whose control target is one or more utilization units for outputting used water as drainage water when input water is used by a user, and includes:

one or more detection units capable of detecting a given physical amount, which is relevant to at least a part of the water input to each of the one or more utilization units and the drainage water output from each of the one or more utilization units, or an amount based thereon; and an information generation unit for generating information regarding use of each of the one or more utilization units by the user based on a result of at least a part of the one or more detection units.

Effects of the Invention

According to the present invention, it is possible to provide a water treatment system by which it is possible to efficiently share a plurality of water utilization units including a shower and it is possible to use drainage water even in an environment in which it is difficult to secure water.

BRIEF DESCRIPTION OF THE DRAWINGS

FIG. 5 is a diagram illustrating a specific example of a screen displayed on a user terminal of a user trying to use a shower booth.

FIG. 7 is a diagram illustrating a specific example of an operation screen displayed on a user terminal of a user trying to use a shower booth.

FIG. 17 is a diagram illustrating the configuration of a water circulation management system according to a third embodiment of the present invention.

FIG. 19 is a diagram illustrating the configuration of a water circulation management system according to a fourth embodiment of the present invention.

PREFERRED MODE FOR CARRYING OUT
THE INVENTION

Hereinafter, embodiments of the present invention will be described with reference to the diagrams.

First Embodiment (System Configuration)

Figure 1:
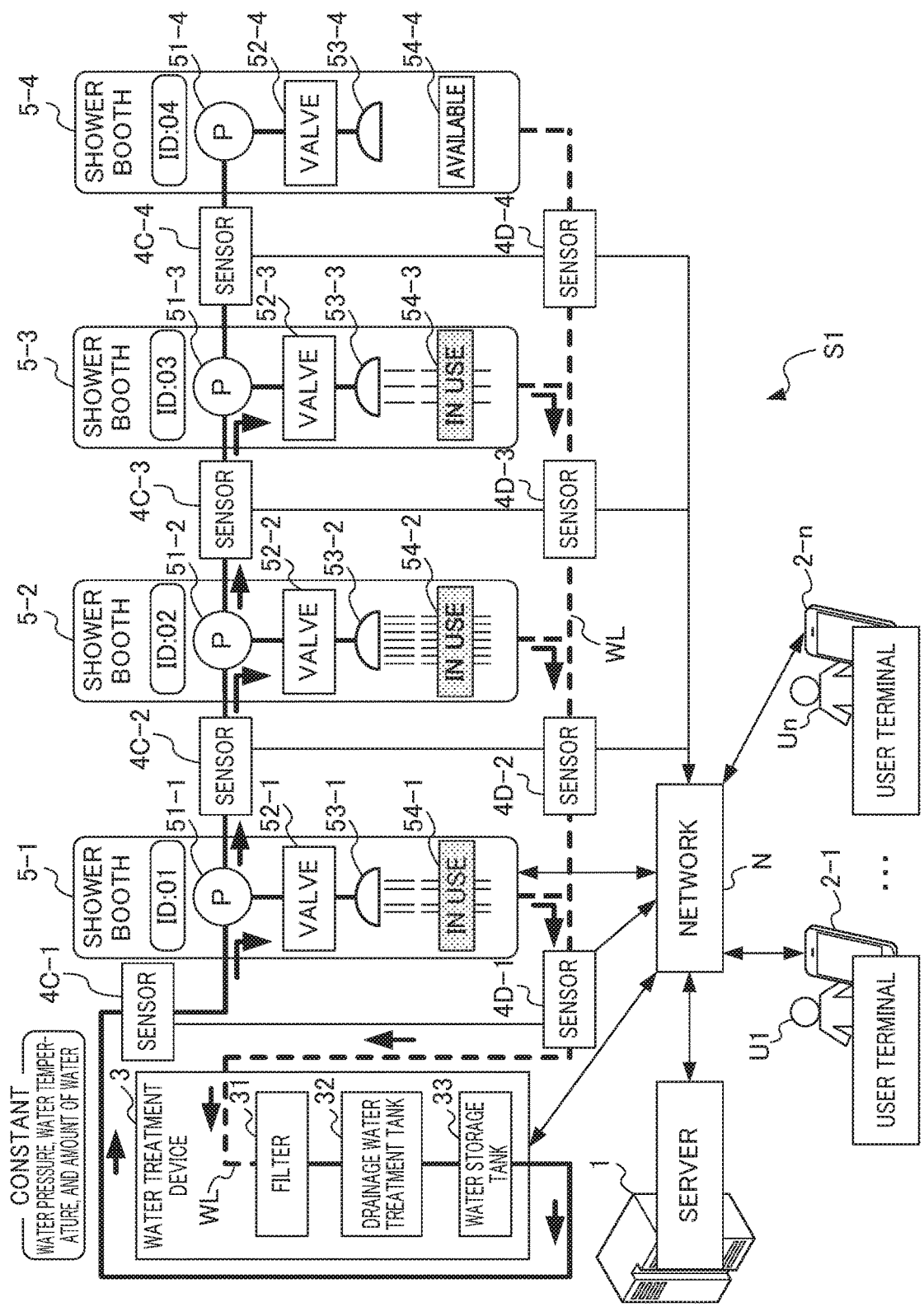
FIG. 1 is a diagram illustrating the configuration of a water circulation management system according to a first embodiment of the present invention.

FIG. 1 is a diagram illustrating the configuration of a water circulation management system S1 according to a first embodiment of the present invention.

The water circulation management system S1 according to the first embodiment of the present invention is configured to include a server 1, user terminals 2-1 to 2-$n$ ($n$ is an arbitrary integer of 1 or more), a water treatment device 3, treated water sensors 4C-1 to 4C-4, drainage water sensors 4D-1 to 4D-4, and shower booths 5-1 to 5-4. The server 1, the user terminals 2-1 to 2$n$, the water treatment device 3, the treated water sensors 4C-1 to 4C-4, the drainage water sensors 4D-1 to 4D-4, and the shower booths 5-1 to 5-4 are connected to each other through a network N, such as the Internet.

The water circulation management system S1 illustrated in FIG. 1 has a configuration in which a plurality of shower booths 5-1 to 5-4 are connected to the water treatment device 3 in series, in parallel, or in a combination of series and parallel by piping in a water passage WL. In addition, in the water passage WL, a solid line indicates a water passage through which treated water flows, and a broken line indicates a water passage through which drainage water flows. The server 1 detects the use status of each of the shower booths 5-1 to 5-4 based on sensing data obtained by the sensing of each of the treated water sensors 4C-1 to 4C-4 and the drainage water sensors 4D-1 to 4D-4 attached to the water passage WL or a valve 52 described later.

When it is not necessary to distinguish the user terminals 2-1 to 2-$n$ and users U1 to Un, these are collectively referred to as "user terminal 2" and "user U", respectively. In addition, when it is not necessary to individually distinguish the treated water sensors 4C-1 to 4C-4, these are collectively referred to as "treated water sensor 4C". In addition, when it is not necessary to individually distinguish the drainage water sensors 4D-1 to 4D-4, these are collectively referred to as "drainage water sensor 4D". When it is not necessary to individually distinguish the shower booths 5-1 to 5-4, these are collectively referred to as "shower booth 5". Hereinafter, each element configuring the water circulation management system S1 will be described.

(Server)

The server 1 controls the input of treated water to each of one or more utilization units based on sensing data obtained by the sensing of the sensing unit. Specifically, the server 1 controls the input of treated water to each of the shower booths 5-1 to 5-4 based on the sensing data obtained by the sensing the treated water sensors 4C-1 to 4C-4 and the drainage water sensors 4D-1 to 4D-4. Therefore, it is possible to provide a water circulation management system by which it is possible to efficiently share a plurality of water utilization devices including a shower booth.

In addition, based on the sensing data, the server 1 generates information (hereinafter, referred to as "water use information") including at least either various kinds of information regarding treated water, such as use start, use stop, use amount, use time, and use environment of treated water, and various kinds of information regarding drainage water, such as drainage start, drainage stop, drainage amount, and water pollution degree of drainage water. Specifically, the server 1 generates water use information in the shower booths 5-1 to 5-4 based on the sensing data. Therefore, it is possible to obtain water use information for enabling a plurality of water utilization devices including a shower booth to be efficiently shared.

In addition, based on the sensing data, the server 1 generates information (hereinafter, referred to as "user use information") including at least one of the use status of a user using each of one or more utilization units and the time taken for a user trying to use each of the one or more utilization units to be able to use the utilization unit. Specifically, based on the sensing data, the server 1 generates user use information including at least one of the use status of the user U using each of the shower booths 5-1 to 5-4 and the time taken for the user U trying to use each of the shower booths 5-1 to 5-4 to be able to use the shower booth 5. The user use information generated by the server 1 is displayed on the user terminal 2 or a touch panel 54 attached to the outer wall of the shower booth 5, which will be described later. Therefore, the user U trying to use the shower booth 5 can immediately grasp the situation until the shower booth 5 becomes available. As a result, the convenience of the user U can be improved. The specific content of the functions that the server 1 has will be described later with reference to FIG. 4.

(User Terminal)

The user terminal 2 is an information processing device operated by the user U trying to use the shower booth 5, and is, for example, a personal computer, a smartphone, or a tablet.

(Water Treatment Device)

The water treatment device 3 treats drainage water output from one or more utilization units using one or more purification units, thereby producing treated water that can be reused by the one or more utilization units. Specifically, the water treatment device 3 treats drainage water output from the shower booths 5-1 to 5-4 using filters 31-1 to 31-$m$ ($m$ is an arbitrary integer of 1 or more), thereby producing treated water that can be reused in the shower booths 5-1 to 5-4. The filter 31 is configured to include at least one or more of a strainer, a thread-wound type filter, a sediment filter, an ultra filtration membrane type filter (hereinafter, referred to as a "UF filter"), a microfiltration filter, a reverse osmosis membrane type filter (hereinafter, referred to as an "RO filter"), a forward osmosis filter, an ion exchange filter, biological treatment, an activated carbon filter, a nano filter (NF), sand filtration, a ceramic filter, a centrifugal filter, and the like.

A drainage water treatment tank 32 is configured to include an intermediate tank and a concentration tank. The intermediate tank temporarily stores water that has passed through some of the filters 31 and purifies the water. Concentrated water produced by the purification is temporarily stored in a concentration tank, and is discarded when maintenance is performed. As described above, by providing the intermediate tank and purifying the water, the wear of the filter 31 is reduced. As a result, the life of the filter 31 can be extended. In addition, by temporarily storing water in the intermediate tank, the total organic carbon (TOC) and total nitrogen (TN) of the water can be estimated. Therefore, the cost for water analysis can be reduced. A water storage tank 33 is a tank for storing the produced treated water. The treated water stored in the water storage tank 33 is output to the shower booth 5. In addition, the temperature of the produced treated water is adjusted by a heater (not illustrated).

(Treated Water Sensor)

The treated water sensor 4C senses treated water input to each of the one or more utilization units. Specifically, the treated water sensor 4C senses treated water input to each of the shower booths 5-1 to 5-4.

(Drainage Water Sensor)

The drainage water sensor 4D senses drainage water output from each of the one or more utilization units. Specifically, the drainage water sensor 4D senses drainage water output from each of the shower booths 5-1 to 5-4.

The treated water sensor 4C and the drainage water sensor 4D are at least one or more sensors capable of detecting water pressure, flow rate, pH, viscosity, turbidity, chromaticity, odor, total organic carbon, total inorganic carbon, total carbon, nitrate nitrogen, nitrite nitrogen, ammonia nitrogen, total nitrogen, residual chlorine, dissolved oxygen, total phosphorus, electrical conductivity, and temperature.

(Shower Booth)

The shower booth 5 is a booth including a shower used by the user U, and includes a pump 51, the valve 52, a shower head 53, the touch panel 54, and a drain pan (not illustrated). The use conditions can be set for men, women, children, pets, and the like according to the type of the user U who uses the shower booth 5. The pump 51 inputs at least a part of the produced treated water to the shower head 53 through the valve 52. In addition, the pump 51 sends out at least a part of the produced treated water to the pump 51 provided in another shower booth 5. Specifically, for example, as illustrated in FIG. 1, the pump 51-1 inputs at least a part of the treated water produced by the water treatment device 3 to the shower head 53-1 through the valve 52-1. In addition, the pump 51-1 sends out at least a part of the treated water produced by the water treatment device 3 to the pump 51-2 provided in the shower booth 5-2. The pumps 51-1 to 51-4 are positive displacement pumps, non-positive displacement pumps, water mallet pumps, bubble pumps, injection pumps, or submersible pumps. The valve 52 is a valve for the user U using the shower booth 5 to perform an operation of adjusting the pressure of treated water sprinkled from the shower head 53. The shower head 53 is a shower head for sprinkling the treated water input by the pump 51. The touch panel 54 is a touch panel attached to the outer wall of the shower booth 5, and displays water use information and user use information. In addition, the touch panel 54 receives an input operation of the user U trying to use the shower booth 5.

Figure 2:
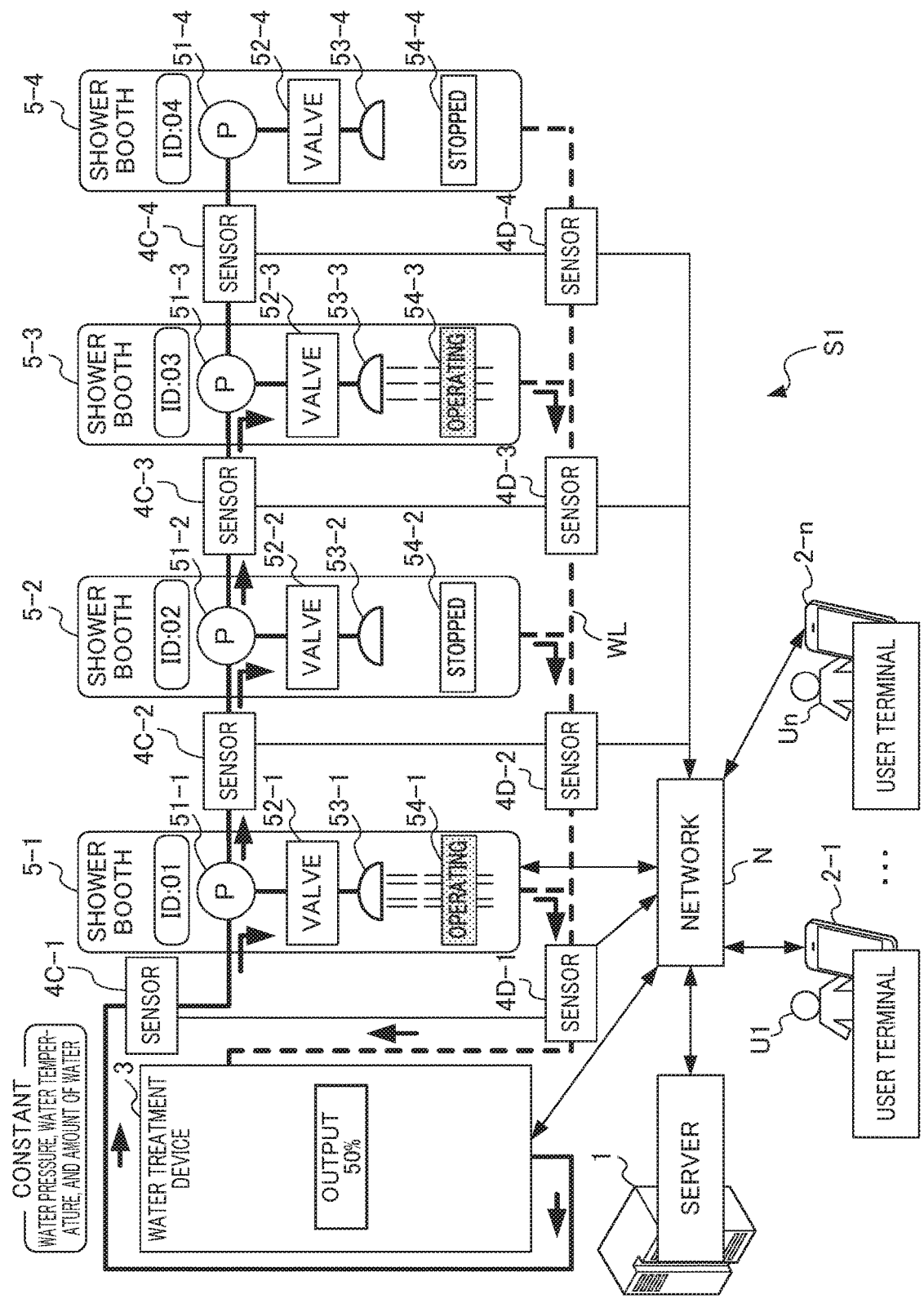
FIG. 2 is a diagram illustrating an output adjustment function for adjusting the amount of treated water output from a water treatment device illustrated in FIG. 1.

FIG. 2 is a diagram illustrating an output adjustment function for adjusting the amount of treated water output from the water treatment device 3. Specifically, FIG. 2 illustrates a relationship between the shower booth 5 and the output of the water treatment device 3 when two of the shower booths 5-1 to 5-4 are operating.

The server 1 adjusts the amount of treated water output from the water treatment device 3 based on water use information generated from the sensing data. For example, when some of the shower booths 5-1 to 5-4 are stopped, the server 1 adjusts the amount of treated water output from the water treatment device 3 in accordance with the number of operating shower booths 5. Therefore, it is possible to suppress the power consumption of the water treatment device 3. In addition, it is possible to suppress the output of treated water more than necessary. Specifically, for example, in the example illustrated in FIG. 2, two of the shower booths 5-1 to 5-4 are stopped. Therefore, the server 1 performs an adjustment to reduce the amount of treated water output from the water treatment device 3 to half (50%) of the output (100%) when all of the shower booths 5-1 to 5-4 are operating based on the water use information generated from the sensing data. In addition, when all the shower booths 5-1 to 5-4 are operating after the amount of treated water output from the water treatment device 3 is reduced to half (50%), the server 1 doubles the amount of treated water output from the water treatment device 3. Therefore, it is possible to prevent the occurrence of an event in which the water pressure of the shower is insufficient. As described above, since the server 1 adjusts the amount of treated water output from the water treatment device 3 based on the water use information generated from the sensing data, the water pressure of the shower becomes constant even when a plurality of shower booths 5 operate. As a result, it is possible to improve the comfort of the user U.

Figure 3:
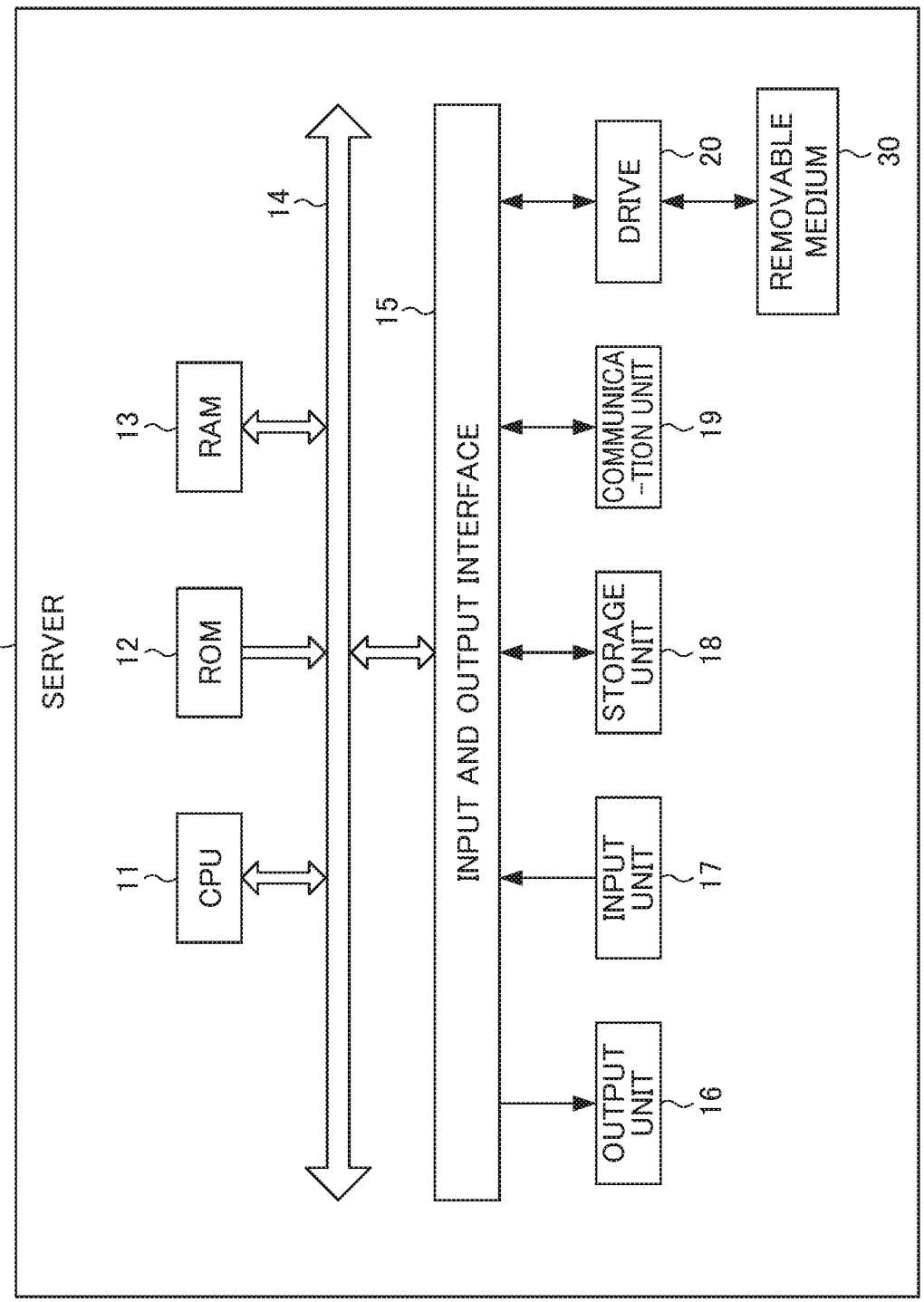
FIG. 3 is a block diagram illustrating an example of the hardware configuration of a server in the water circulation management system illustrated in FIG. 1.

(Hardware Configuration) FIG. 3 is a block diagram illustrating an example of the hardware configuration of the server 1 in the water circulation management system illustrated in FIG. 1.

The server 1 includes a central processing unit (CPU) 11, a read only memory (ROM) 12, a random access memory (RAM) 13, a bus 14, an input and output interface 15, an output unit 16, an input unit 17, a storage unit 18, a communication unit 19, and a drive 20.

The CPU 11 executes various processes according to a program recorded in the ROM 12 or a program loaded from the storage unit 18 to the RAM 13. The RAM 13 also appropriately stores data and the like necessary for the CPU 11 to execute various processes.

The CPU 11, the ROM 12, and the RAM 13 are connected to each other through a bus 14. The bus 14 is also connected to the input and output interface 15. The output unit 16, the input unit 17, the storage unit 18, the communication unit 19, and the drive 20 are connected to the input and output interface 15.

The output unit 16 is a liquid crystal display or the like, and displays various images. The input unit 17 is configured to include various hardware buttons and the like, and inputs various kinds of information in accordance with an instruction operation of an operator.

The storage unit 18 is a dynamic random access memory (DRAM) or the like, and stores various kinds of data. The communication unit 19 controls communication with other devices (for example, the user terminal 2, the water treatment device 3, the treated water sensor 4C, the drainage water sensor 4D, and the shower booth 5) through the network N including the Internet.

The drive 20 is provided as necessary. A removable medium 30, such as a magnetic disk, an optical disc, a magneto-optical disc, and a semiconductor memory, is appropriately mounted on the drive 20. A program read from the removable medium 30 by the drive 20 is installed on the storage unit 18 as necessary. In addition, the removable medium 30 can store various kinds of data stored in the storage unit 18 in the same manner as the storage unit 18.

By the cooperation of various kinds of hardware and various kinds of software of the server 1 illustrated in FIG. 3, it is possible to execute various processes described later. In addition, although not illustrated, the user terminal 2, the water treatment device 3, the treated water sensor 4C, the drainage water sensor 4D, and the shower booth 5 in the water circulation management system illustrated in FIG. 1 also have the hardware configuration illustrated in FIG. 5. Here, each of the user terminal 2 and the shower booth 5 has a touch panel as the output unit 16 and the input unit 17.

(Functional Configuration)

Figure 4:
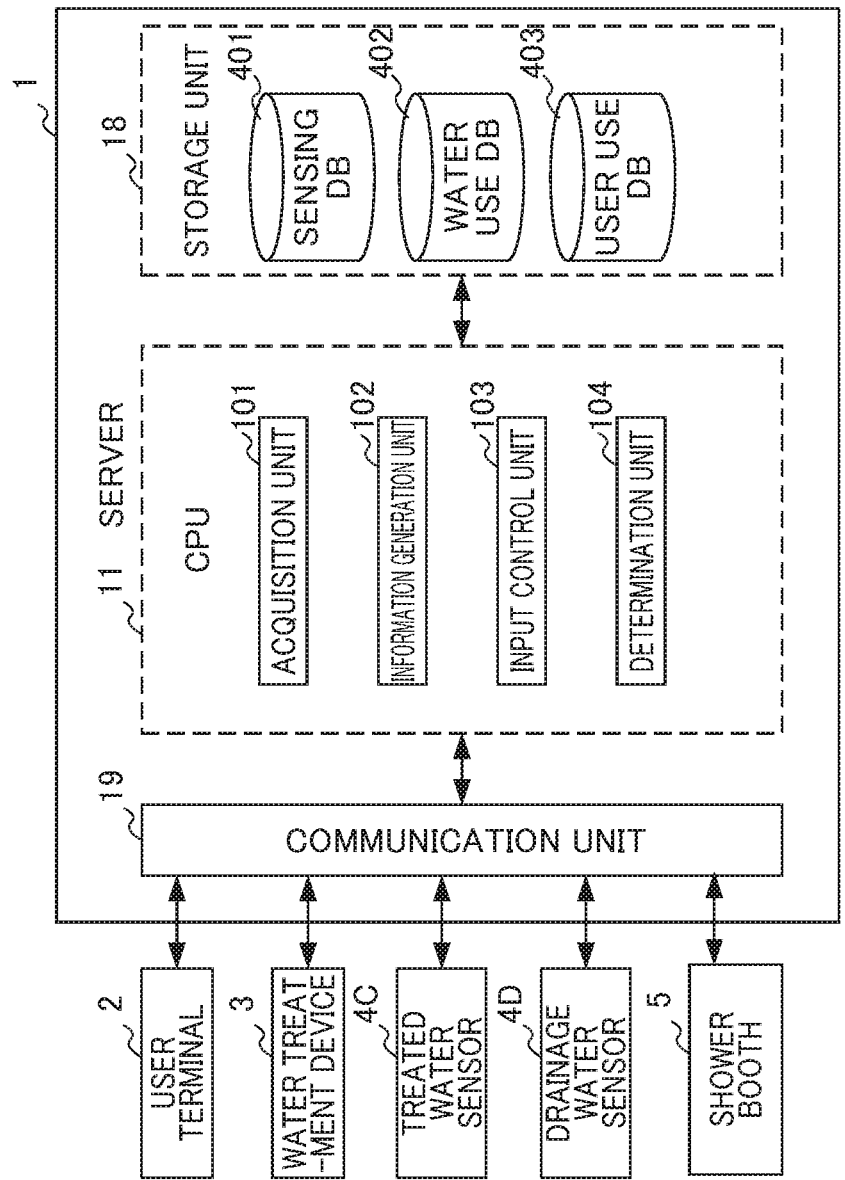
FIG. 4 is a functional block diagram illustrating an example of a functional configuration for realizing water circulation processing and filter determination processing in the functional configuration of the server illustrated in FIG. 3.

FIG. 4 is a functional block diagram illustrating an example of a functional configuration for realizing water circulation processing and filter determination processing in the functional configuration of the server 1 illustrated in FIG. 3.

"Water circulation processing" refers to processing for managing the flow of water between one or more water utilization devices, through which water is used and drained, and one or more water treatment devices that purify drainage water to produce usable water for the water utilization devices. "Filter determination processing" refers to processing for determining the configuration of one or more filters 31 used to treat drainage water by the water treatment device 3 among the one or more filters 31 included in the water treatment device 3.

As illustrated in FIG. 4, in the CPU 11 of the server 1, when the water circulation processing is performed, an acquisition unit 101, the information generation unit 102, and an input control unit 103 function. When the filter determination processing is performed, a determination unit 104 further functions. In addition, a sensing DB 401, a water use DB 402, and a user use DB 403 are provided in one area of the storage unit 18.

The acquisition unit 101 acquires sensing data obtained by sensing. Specifically, the acquisition unit 101 acquires sensing data obtained by the sensing of the treated sensor 4C and the drainage water sensor 4D. The acquired sensing data is stored and managed in the sensing DB 401.

Based on the sensing data, the information generation unit 102 generates water use information including at least one of the use start, use stop, use amount, and use time of treated water in each of the one or more utilization units. Specifically, based on the sensing data, the information generation unit 102 generates water use information including at least one of the use start, use stop, use amount, and use time of treated water in each of the shower booths 5-1 to 5-4. The generated water use information is stored and managed in the water use DB 402.

In addition, based on the sensing data, the information generation unit 102 generates user use information including at least one of the use status of a user using each of one or more utilization units and the time taken for a user trying to use one or more utilization units to be able to use the utilization unit. Specifically, based on the sensing data, the information generation unit 102 generates user use information including at least one of the use status of the user U using each of the shower booths 5-1 to 5-4 and the time taken for the user U trying to use the shower booth 5 to be able to use the shower booth 5. The generated user use information is stored and managed in the user use DB 403.

The input control unit 103 controls the input of treated water to each of the one or more utilization units based on the sensing data obtained by the sensing. Specifically, the input control unit 103 controls the input of treated water to each of the shower booths 5-1 to 5-4 based on the sensing data obtained by the sensing.

In addition, when water use information is generated by the information generation unit 102, the input control unit 103 further controls the input of treated water to each of the one or more utilization units based on the water use information. Specifically, the input control unit 103 controls the input of treated water to each of the shower booths 5-1 to 5-4 based on the sensing data and the water use information generated based on the sensing data.

The determination unit 104 determines the configuration of the purification unit to be used to treat drainage water, among one or more purification units, based on the water use information. Specifically, the determination unit 104 determines the configuration of one or more filters 31 to be used to treat drainage water, among the filters 31-1 to 31-$m$, based on the water use information.

The sensing data obtained by the sensing of the treated sensor 4C and the drainage water sensor 4D is stored in the sensing DB 401 and managed. The water use information generated based on the sensing data is stored in the water use DB 402 and managed. The user use information generated based on the sensing data is stored in the user use DB 404 and managed.

FIG. 5 is a diagram illustrating a specific example of a screen displayed on the user terminal 2 of the user U trying to use the shower booth 5.

As described above, the server 1 generates user use information based on the sensing data, and displays the user use information on the user terminal 2. As illustrated in FIG. 5, the shower booths 5-1 to 5-4 have shower IDs of 1 to 4 as information for uniquely identifying the shower booths 5-1 to 5-4, respectively. The user terminal 2 displays a waiting time for each shower ID as user use information. Therefore, since the user U who desires to take a shower using the shower booth 5 can immediately know the time until the user U can take a shower, it is possible to improve the convenience of the user U. Specifically, the user terminal 2 displays that the waiting time of the shower booth 5-1 having a shower ID "01" is "5 min (minutes)", the waiting time of the shower booth 5-2 having a shower ID "02" is "15 min (minutes)", the waiting time of the shower booth 5-3 having a shower ID "03 "is" 1 min (minute)", and the waiting time of the shower booth 5-4 having a shower ID "04" is "OK (that is, usable immediately)". Therefore, the user U can immediately know that the shower booth 5-4 having a shower ID "04" can be used immediately.

Next, a method of estimating the waiting time of the shower booth 5 will be described. FIG. 6 is a graph used for estimating the waiting time of the shower booth 5. The horizontal axis of the graph in FIG. 6 indicates time (minutes), and the vertical axis indicates the amount of water.

Figure 6A:
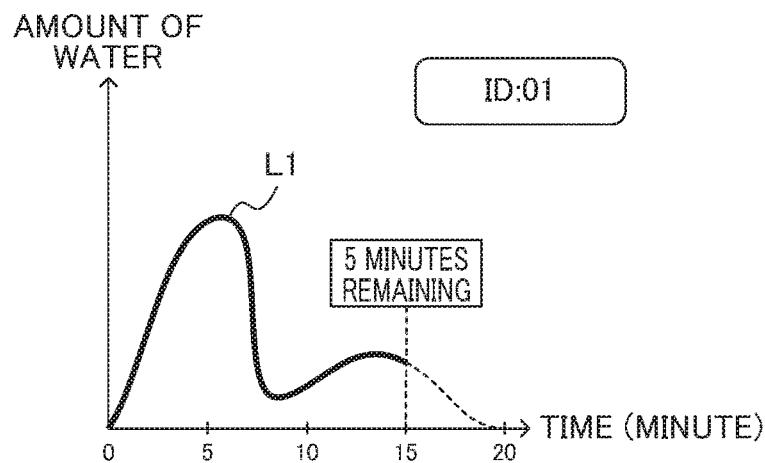
FIG. 6A is a graph used for estimating the waiting time of a shower booth.
Figure 6B:
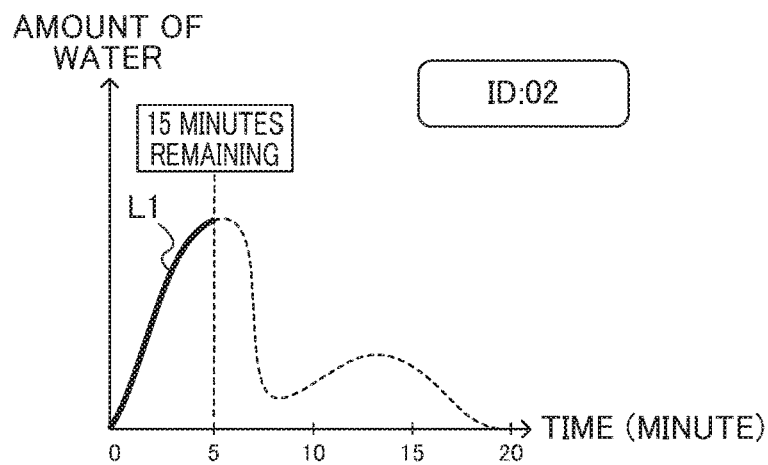
FIG. 6B is a graph used for estimating the waiting time of a shower booth.
Figure 6C:
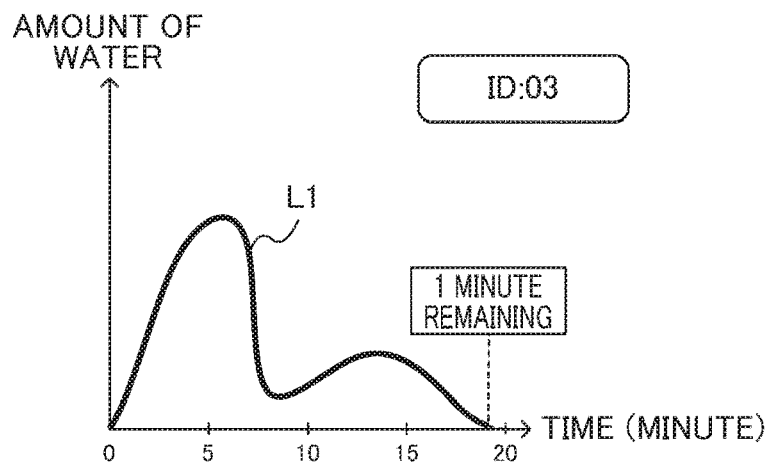
FIG. 6C is a graph used for estimating the waiting time of a shower booth.

Since a curve L1 indicated by the solid line in the graph of FIG. 6 has a shape based on accumulated sensing data, the curve L1 is basis information when estimating the time for each of the users U1 to Un to use the shower booth 5. Specifically, FIG. 6A is a graph used when estimating the waiting time of the shower booth 5-1 having a shower ID "01". As shown in FIG. 6A, the waiting time of the shower booth 5-1 having a shower ID "01" is estimated to be "5 minutes remaining". In addition, FIG. 6B is a graph used when estimating the waiting time of the shower booth 5-2 having a shower ID "02". As shown in FIG. 6B, the waiting time of the shower booth 5-2 having a shower ID "02" is estimated to be "15 minutes remaining". In addition, FIG. 6C is a graph used when estimating the waiting time of the shower booth 5-3 having a shower ID "03". As shown in FIG. 6C, the waiting time of the shower booth 5-3 having a shower ID "03" is estimated to be "1 minute remaining".

FIG. 7 is a diagram illustrating a specific example of an operation screen displayed on the user terminal 2 of the user U trying to use the shower booth 5.

In FIG. 6 described above, the time until the shower booths 5-1 to 5-4 can be used is displayed. However, in FIG.

7, information that shows the status of each of the shower booths 5-1 to 5-4 is displayed. In the example illustrated in FIG. 7, information separated by tabs is displayed for each status of the shower booths 5-1 to 5-4. Specifically, as the status of each of the shower booths 5-1 to 5-4, "in use", "available", and "under maintenance" are exemplified. In addition, it is shown that the shower booth 5-4 having a shower ID "04" is "available". Therefore, since the user U can know immediately that the shower booth 5-4 having a shower ID "04" can be used immediately, it is possible to improve the convenience of the user U.

Figure 8:
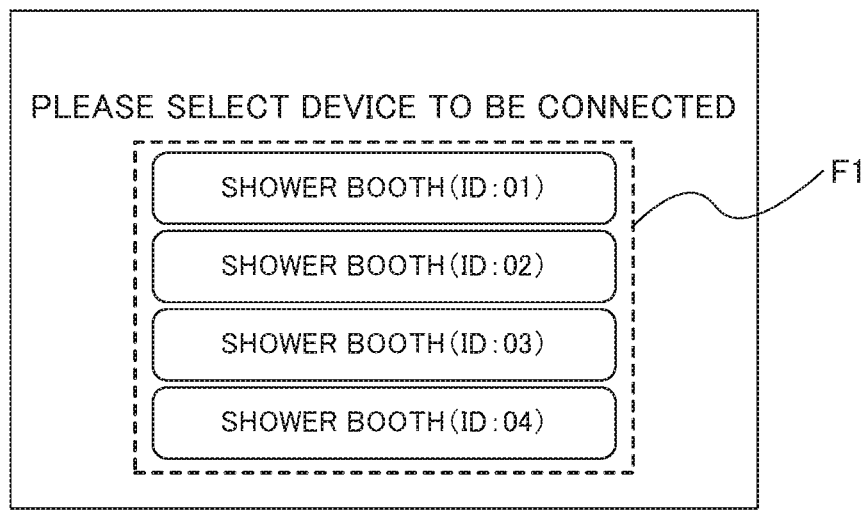
FIG. 8 is a diagram illustrating a specific example of an operation screen displayed on a user terminal of a user trying to use a shower booth.

FIG. 8 is a diagram illustrating a specific example of an operation screen displayed on the user terminal 2 of the user U trying to use the shower booth 5.

In the display area F1 of the operation screen illustrated in FIG. 8, buttons indicating the shower booths 5-1 to 5-4 are arranged. Specifically, a button displayed as "shower booth (ID: 01)", a button displayed as "shower booth (ID: 02)", a button displayed as "shower booth (ID: 03)", and a button displayed as "shower booth (ID: 04)" are arranged. For example, when the user U desires to know the status of the shower booth 5-4, the user U presses a button displayed as "shower booth (ID: 04)" indicating the shower booth 5-4.

FIG. 9 is a diagram illustrating a specific example of an operation screen displayed on the user terminal 2 of the user U trying to use the shower booth 5.

By operating the user terminal 2, the user U can select any one of the shower booths 5-1 to 5-4 to give an instruction to start preparation for making the shower booth 5 usable (hereinafter, referred to as "preparation for use").

Figure 9A:
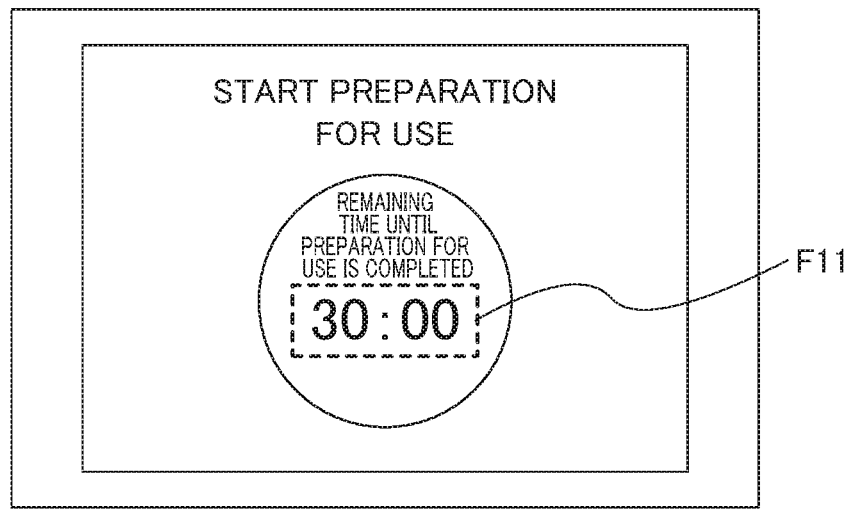
FIG. 9A is a diagram illustrating a specific example of an operation screen displayed on a user terminal of a user trying to use a shower booth.

When the user U issues an instruction for preparation for use of the shower booth 5, preparation for use of the shower booth 5 is started. Specifically, in the water treatment device 3, preparation for outputting treated water at a predetermined temperature with a predetermined pressure is started. FIG. 9A is a diagram illustrating a specific example of a screen displayed when the preparation for use of the shower booth 5 is started among screens displayed on the user terminal 2. Specifically, "30:00 (30 minutes)" is displayed in the display area F11, as the remaining time until the preparation for use is completed, together with a message "Start preparation for use". In addition, the preparation for use of the shower booth 5 includes preparation of treated water used for shower by purifying drainage water, preparation for setting the water temperature to a target temperature, and the like.

Figure 9B:
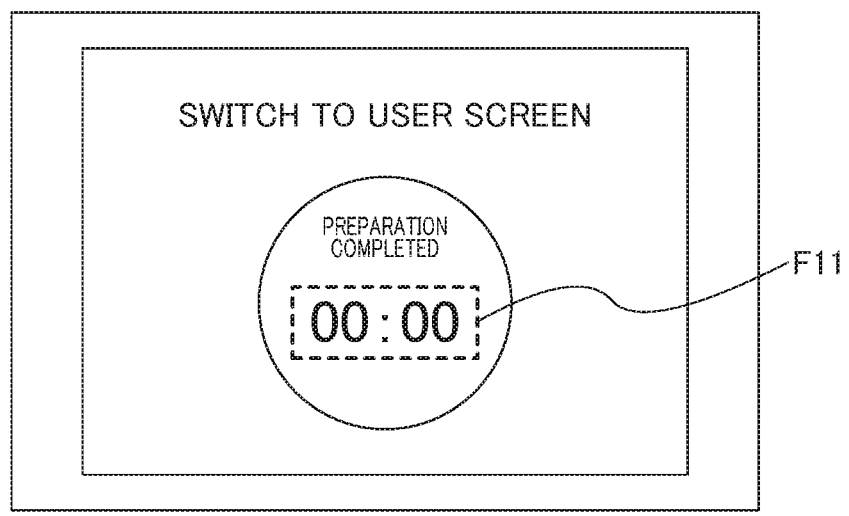
FIG. 9B is a diagram illustrating a specific example of an operation screen displayed on a user terminal of a user trying to use a shower booth.

When the preparation for use of the shower booth 5 is completed, the fact is displayed on the user terminal 2. FIG. 9B is a diagram illustrating a specific example of a screen displayed when the preparation for use of the shower booth 5 is completed among screens displayed on the user terminal 2. Specifically, "00:00 (0 minute)" is displayed in the display area F11, as the remaining time until the preparation for use is completed, together with a message "Switch to the user screen".

Figure 9C:
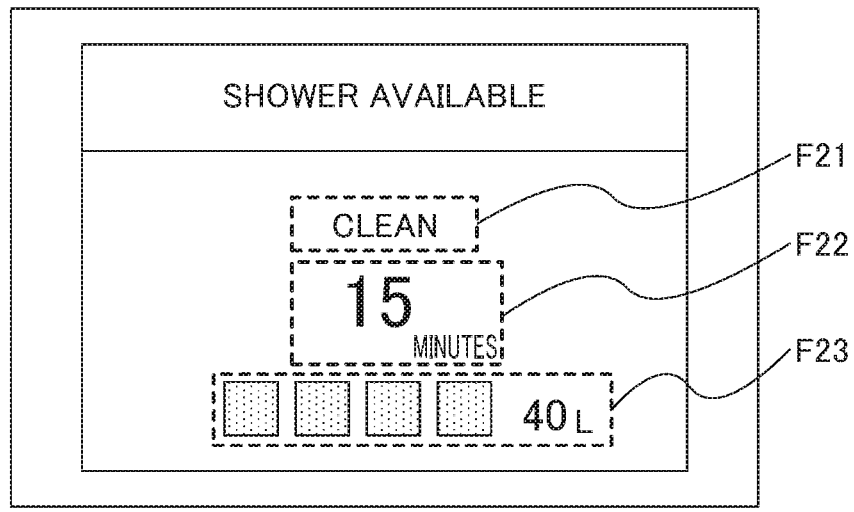
FIG. 9C is a diagram illustrating a specific example of an operation screen displayed on a user terminal of a user trying to use a shower booth.

FIG. 9C is a diagram illustrating a specific example of a user screen displayed when the shower booth 5 can be used among screens displayed on the user terminal 2. The user screen illustrated in FIG. 9C is configured to include display areas F21 to F23. Specifically, in the display area F21, water quality (clean) of treated water prepared for shower is displayed. In addition, in the display area F22, the available time (15 minutes) of the shower booth 5 is displayed. In addition, in the display area F23, the amount (40 L (liter)) of treated water prepared for the shower is displayed. Therefore, the user U can check the quality of treated water, the available time of the shower booth 5, and the amount of treated water that can be used with the use of the shower booth 5, before starting to use the shower booth 5.

FIG. 10 is a diagram illustrating a specific example of an operation screen displayed on the user terminal 2 of the user U while using the shower booth 5 or after using the shower booth 5.

Figure 10A:
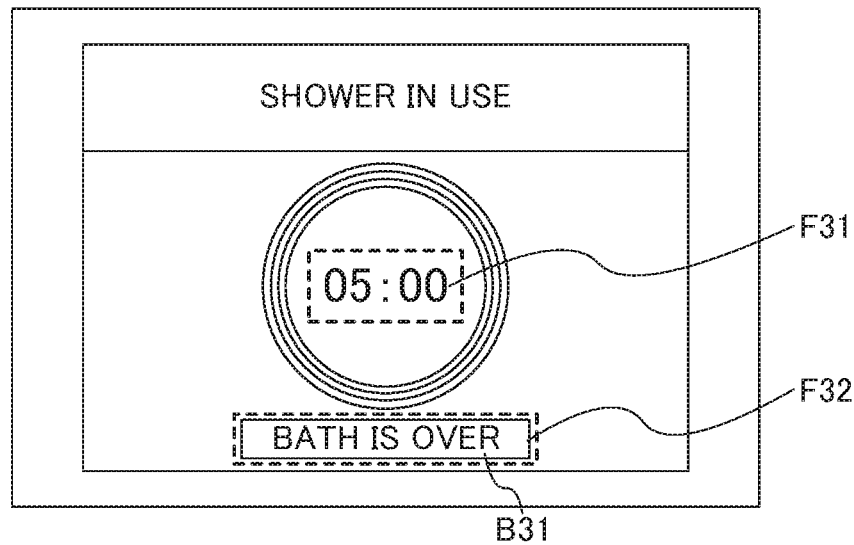
FIG. 10A is a diagram illustrating a specific example of an operation screen displayed on a user terminal of a user while using a shower booth or after using the shower booth.
Figure 10B:
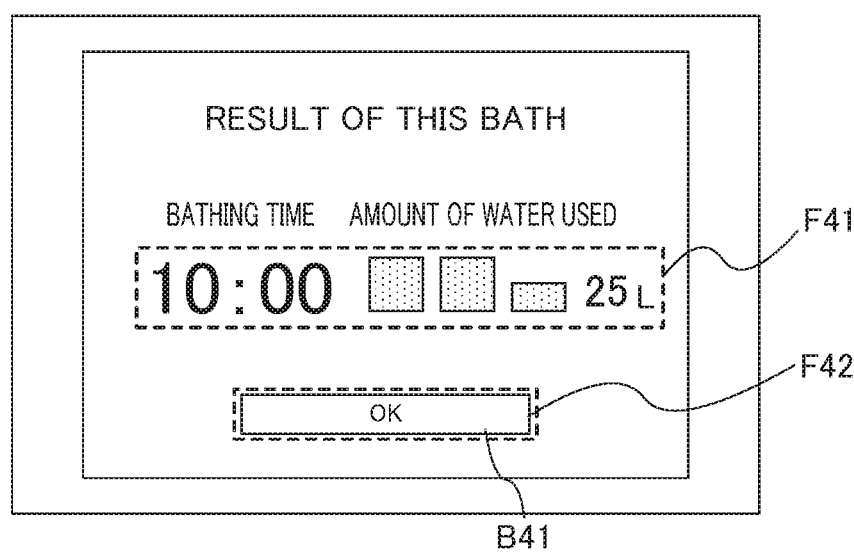
FIG. 10B is a diagram illustrating a specific example of an operation screen displayed on a user terminal of a user while using a shower booth or after using the shower booth.

FIG. 10A is a diagram illustrating a specific example of an operation screen displayed on the user terminal 2 of the user U while using the shower booth 5. The screen illustrated in FIG. 10A described above is configured to include a display area F31 and a display area F32. In the display area F31, the time elapsed since the user U started using the shower booth 5 is 05:00 (5 minutes) is displayed. In the display area F32, a button B31 that is pressed by the user U when ending the use of the shower booth 5 is displayed. FIG. 10B is a diagram illustrating a specific example of an operation screen displayed on the user terminal 2 of the user U after using the shower booth 5. When the button B31 illustrated in FIG. 10A is pressed, a screen showing the use result (hereinafter, referred to as "bath result") of the shower booth 5 is displayed on the user terminal 2 of the user U who has used the shower booth 5, as illustrated in FIG. 10B. The screen illustrated in FIG. 10B is configured to include a display area F41 and a display area F42. In the display area F41, it is displayed that the use time (bathing time) of the shower booth 5 was 10:00 (10 minutes), and the amount of treated water used with the use of the shower booth 5 was 25 L (liter). In the display area F42, a button B41 that is pressed when the user U confirms the bath result displayed in the display area F41 is displayed. When the button B41 is pressed, an operation screen (FIG. 11) for performing an operation to end the use of the shower booth 5 is displayed on the user terminal 2. Although not illustrated, when a trouble occurs in the shower booth 5, an alert and contact information for the operator are displayed on the user terminal 2. In addition, a maintenance screen is displayed as necessary. The details of the maintenance screen will be described later with reference to FIG. 12.

FIG. 11 is a diagram illustrating a specific example of an operation screen for performing an operation of ending the use of the shower booth 5.

Figure 11A:
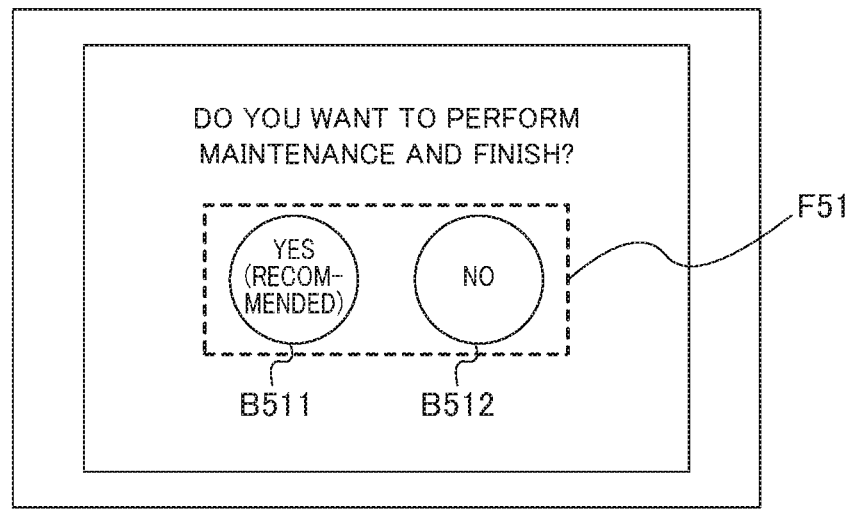
FIG. 11A is a diagram illustrating a specific example of an operation screen for performing an operation of ending the use of a shower booth.

FIG. 11A is a diagram illustrating an example of an operation screen for issuing an instruction to end the use of the shower booth 5 after maintenance of the shower booth 5 is performed. Specifically, a message "Do you want to perform maintenance and finish?" is displayed, and a button B511 on which "Yes (recommended)" is written and a button B512 on which "No" is written are displayed in the display area F51. The user U presses one of the two buttons displayed in the display area F51.

When the button B512 on which "No" is written, between the two buttons displayed in the display area F51 in FIG. 11A, is pressed, it is possible to end the use of the shower booth 5 as it is. On the other hand, when the button B511 on which "Yes (recommended)" is written is pressed, an operation screen for performing maintenance of the shower booth 5 is displayed.

Figure 11B:
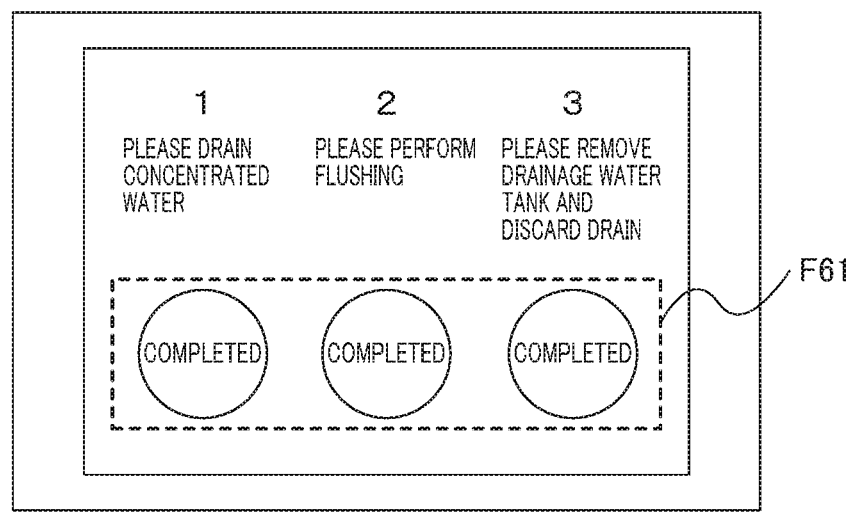
FIG. 11B is a diagram illustrating a specific example of an operation screen for performing an operation of ending the use of a shower booth.

FIG. 11B is a diagram illustrating an example of an operation screen for performing maintenance of the shower booth 5. Specifically, it is shown that the maintenance work of the shower booth 5 is performed in the following three steps. That is, as a first step, a message "Please drain the concentrated water" is displayed as a guide to perform an operation of draining the concentrated water. In addition, as a second step, a message "Please perform flushing" is displayed as a guide to perform flushing. In addition, as a third step, a message "Please remove the drainage water tank and perform drainage" is displayed as a guide to perform an operation of discarding drainage water stored in the drainage water tank of the shower booth 5. In the display area F61 below the guidance message of each step, buttons on which "completed" is written, which are pressed when the maintenance work in each step is performed, are displayed.

Figure 12:
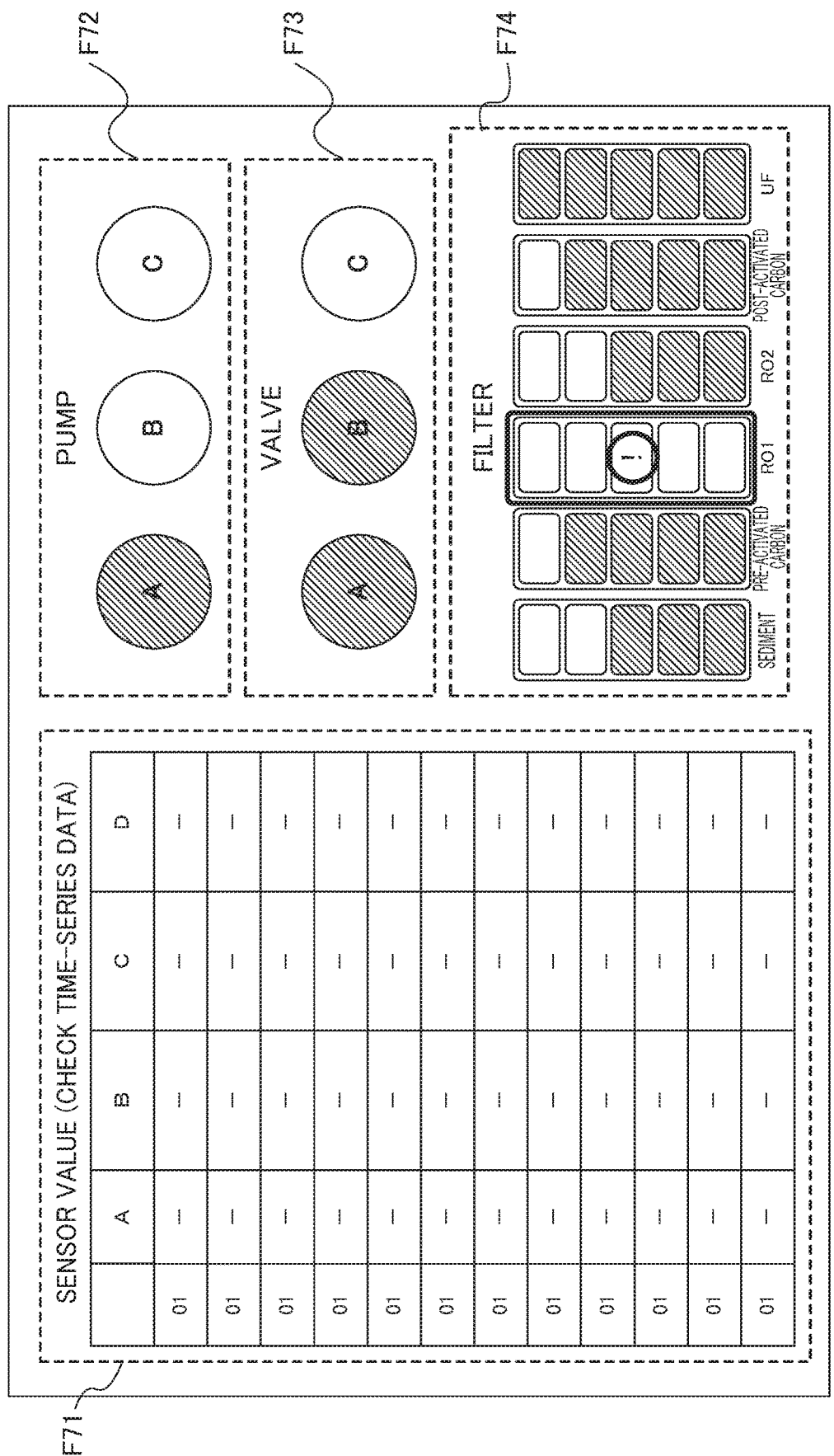
FIG. 12 is a diagram illustrating a specific example of a maintenance screen displayed on a user terminal.

FIG. 12 is a diagram illustrating a specific example of the maintenance screen displayed on the user terminal 2.

According to the sensing data obtained by the sensing of the treated water sensor 4C and the drainage water sensor 4D, information regarding the condition of the pump 51 (hereinafter, referred to as "pump information"), information regarding the condition of the valve 52 (hereinafter, referred to as "valve information"), and information regarding the condition of the filter 31 (hereinafter, referred to as "filter information") can be generated in addition to the water use information and the user use information described above. When maintenance is performed, a maintenance screen including the water use information, the pump information, the valve information, and the filter information is displayed on the user terminal 2.

As illustrated in FIG. 12, the maintenance screen is configured to include display areas F71 to F74. In the display area F71, the content of the sensing data obtained by the sensing of the treated water sensor 4C and the drainage water sensor 4D is displayed together with the title of "sensor value (check time-series data)". Here, the content of the displayed sensing data is not particularly limited. In the example illustrated in FIG. 11, an ID number (SP ID) for uniquely identifying the corresponding pump 51 and various kinds of water quality data (A to D) are displayed.

In the display area F72, as a specific example of the pump information, icons indicating three pumps 51 displayed as "A", "B", and "C" are displayed. Among these, only the icon displayed as "A" is colored. This means that the pump 51 indicated by the icon displayed as "A" is operating.

In the display area F73, as a specific example of the valve information, icons indicating three valves 52 displayed as "A", "B", and "C" are displayed. Among these, the icon displayed as "A" and the icon displayed as "B" are colored. This means that the pump 51 indicated by the icon displayed as "A" and the pump 51 indicated by the icon displayed as "B" are operating.

In the display area F74, as a specific example of the filter information, the condition of each of a plurality of filters 31 used in the water treatment device 3 is shown. Specifically, for example, the filters 31 can include a sediment filter, a pre-activated carbon type filter (hereinafter, referred to as a "pre-activated carbon filter"), two RO filters (RO1 filter and RO2 filter), and a post-activated carbon type filter (hereinafter, referred to as a "post-activated carbon filter"), and a UF membrane filter.

In the display area F74, the condition of each of the sediment filter, the pre-activated carbon filter, the RO1 filter, the RO2 filter, the post-activated carbon filter, and the UF filter, which configure the filters 31, is displayed so as to be grasped at a glance. Specifically, in a case where the life from the replacement of the filter 31 to the next replacement is indicated in five stages, the length of the life until the next replacement is indicated by the number of blocks. For example, the lifespan of the sediment filter, among the filters 31, is about three-fifths remaining. On the other hand, the filter 31 specified by the name "RO1" has no remaining life, and a mark for prompting replacement is displayed.

Figure 13:
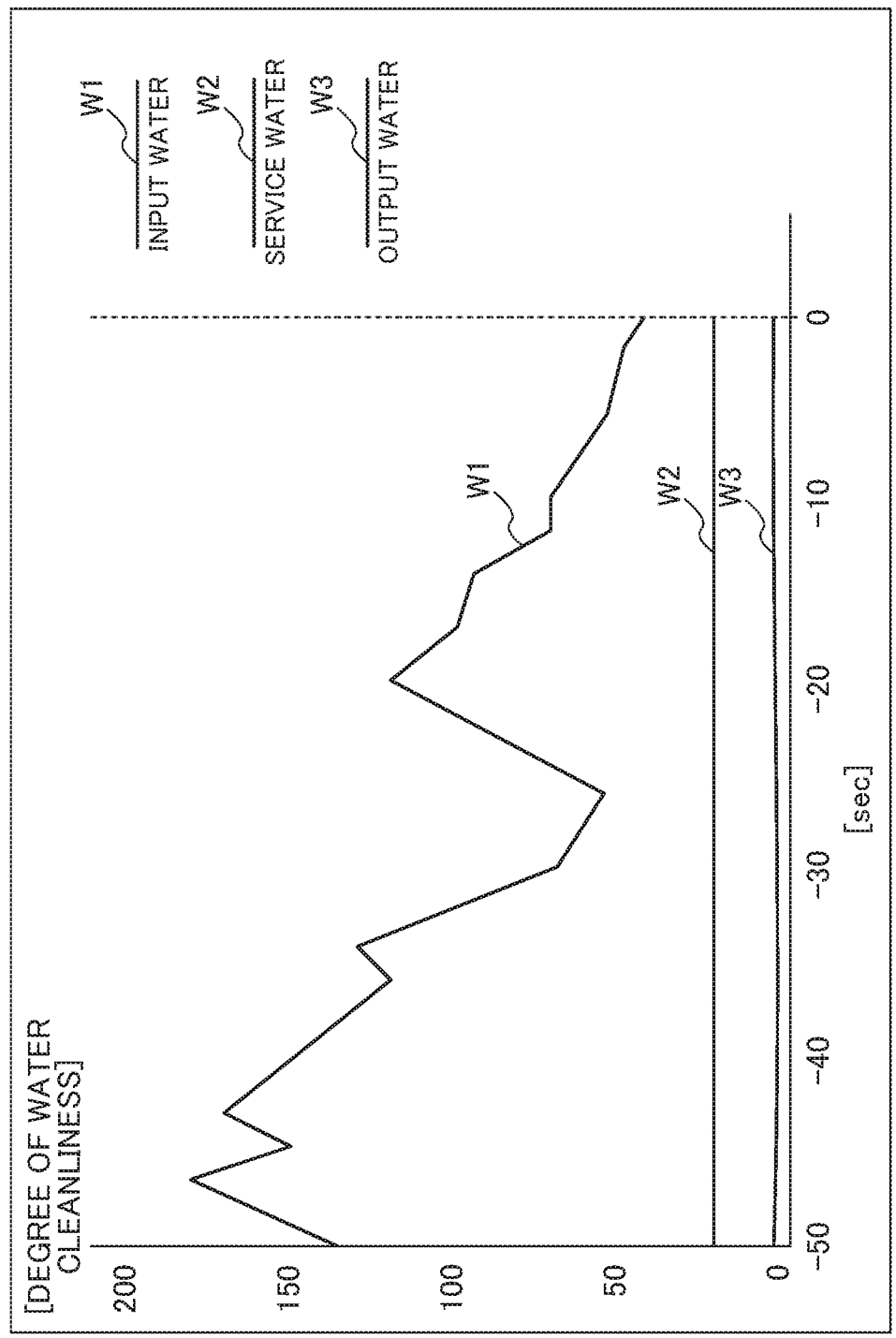
FIG. 13 is a diagram illustrating a specific example in a case where the details of sensor data are displayed on a maintenance screen displayed on a user terminal.

FIG. 13 is a diagram illustrating a specific example in a case where the details of sensor data are displayed on the maintenance screen displayed on the user terminal 2.

In the example of FIG. 13, as the details of the sensor data, a graph showing the transition of water quality data for each of treated water (INPUT WATER) W1 input from the water treatment device 3 to the shower booth 5, treated water (SERVICE WATER) W2 sprinkled from the shower head 53 in INPUT WATER, and drainage water (OUTPUT WATER) W3 output from the shower booth 5 is shown. In addition, the horizontal axis of the graph illustrated in FIG. 12 indicates time (minutes), and the vertical axis indicates the degree of water cleanliness.

Figure 14:
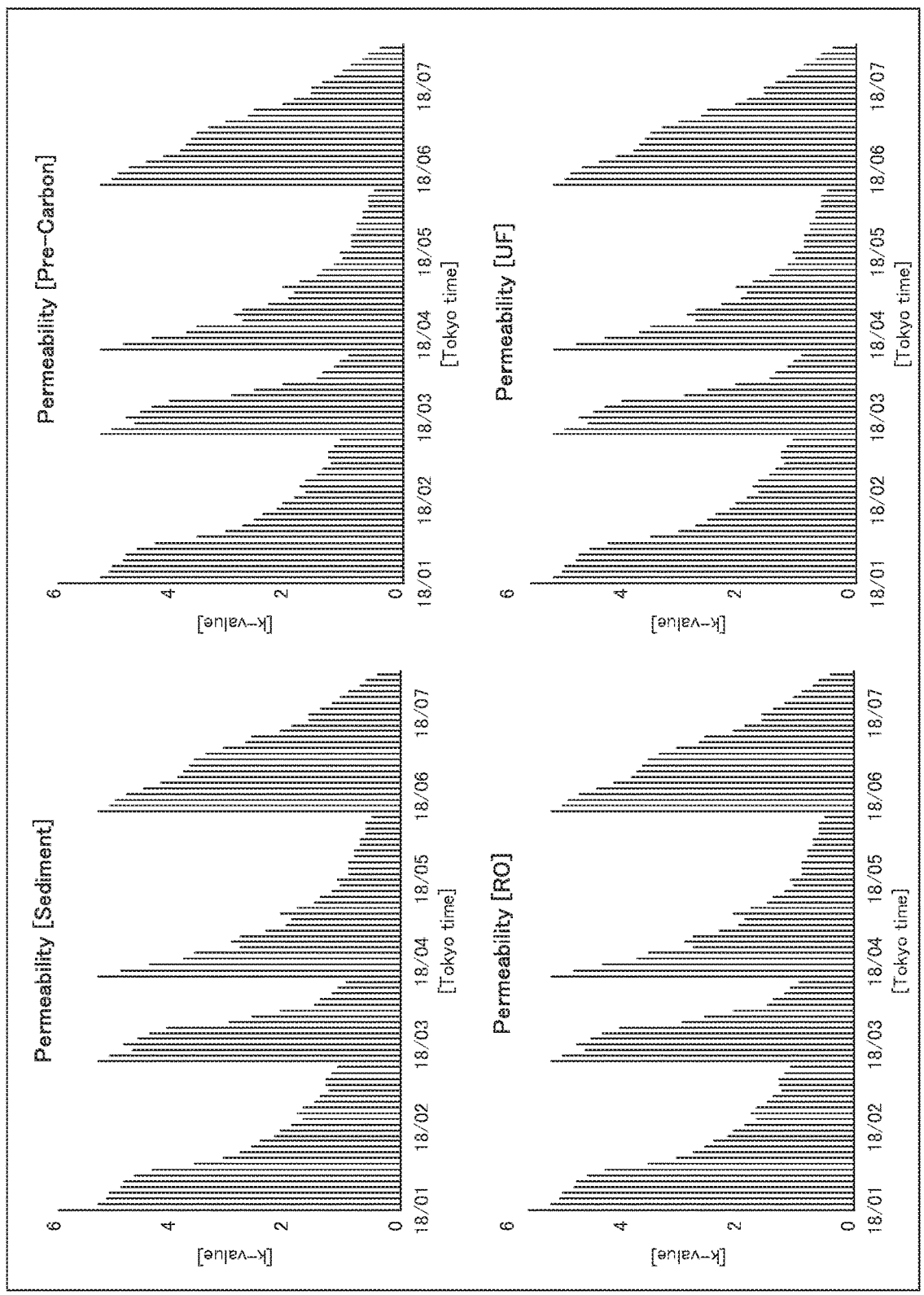
FIG. 14 is a diagram illustrating a specific example in a case where the details of filter information are displayed on a maintenance screen displayed on a user terminal.

FIG. 14 is a diagram illustrating a specific example in a case where the details of filter information are displayed on the maintenance screen displayed on the user terminal 2.

As illustrated in FIG. 14, as the details of the filter information, graphs showing the transitions of the transmittances of a sediment filter (Sediment), a pre-activated carbon filter (Pre-Carbon), an RO membrane filter (RO), and a UF membrane filter (FU) are displayed on the user terminal 2. The horizontal axis of the graph shown in FIG. 14 indicates time (month), and the vertical axis indicates the capacity (k-value) of the filter.

FIG. 15 is a diagram illustrating the configuration of the filter of the filter 31 as the purification unit used for treating drainage water.

The server 1 determines the configuration of one or more filters 31 used to treat drainage water, among the filters 31-1 to 31-*m*, based on the water use information. Therefore, the configuration of one or more filters 31 for purifying drainage water can be efficiently determined according to the amount of drainage water, types of substances contained in the drainage water, and the like. As a result, drainage water can be efficiently purified, so that it is possible to delay the replacement time of the filter 31 or to extend the lifespan of the filter 31.

Figure 15A:
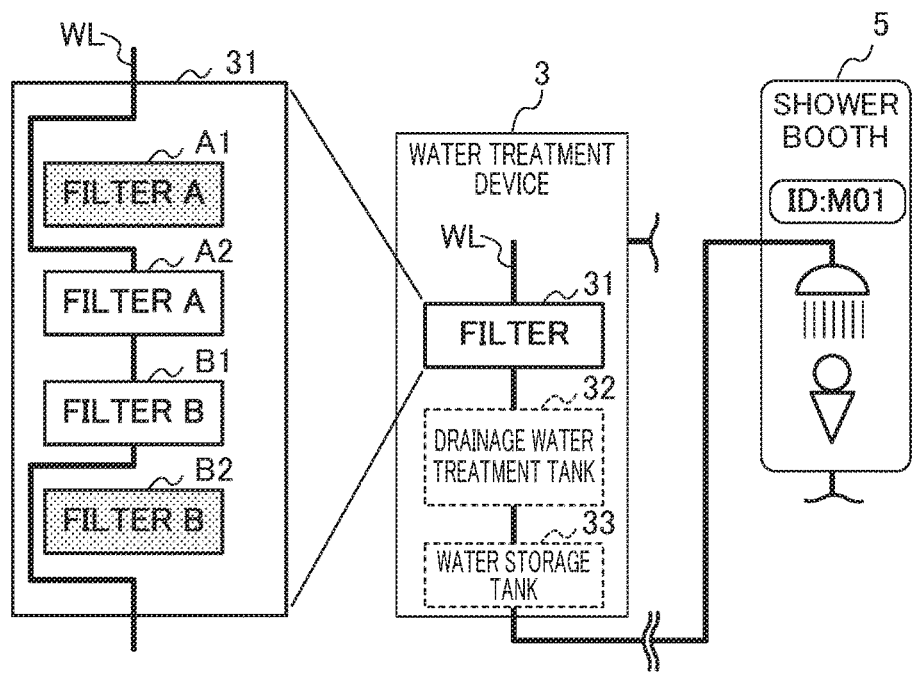
FIG. 15A is a diagram illustrating the configuration of a filter as a purification unit used for treating drainage water.
Figure 15B:
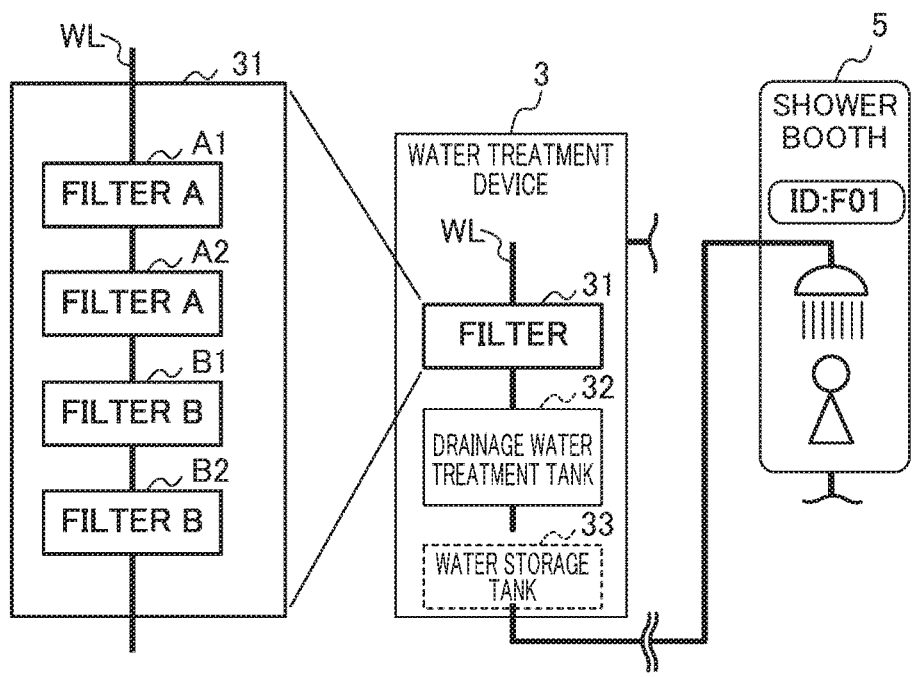
FIG. 15B is a diagram illustrating the configuration of a filter as a purification unit used for treating drainage water.

Each of FIGS. 15A and 15B illustrates a specific example of the configuration of one or more filters 31 used to treat drainage water. Specifically, as illustrated in FIGS. 15A and 15B, two types of filters (filter A and filter B), the number of each type of filters is two, are prepared as the filters 31. As described above, the configuration of one or more filters 31 for purifying drainage water is determined according to the amount of drainage water, types of substances contained in the drainage water, and the like. For example, when comparing a case where the user U using the shower booth 5 is a male with a case where the user U using the shower booth 5 is a female, there are differences in substances contained in the drainage water since the female may remove makeup.

FIG. 15A illustrates the shower booth 5 having a shower ID "M01" as an example of the shower booth 5 for men. In this case, the filter 31 is configured to use two types of filters (filter A and filter B), the number of each type of filters is one. Specifically, the filter 31 is configured such that the water passage WL passes through the filters A2 and B1 among the filters A1, A2, B1, and B2 prepared as the filter 31. On the other hand, FIG. 15B illustrates the shower booth 5 having a shower ID "F01" as an example of the shower booth 5 for women. In this case, the filter 31 is configured to use all filters. Specifically, the filter 31 is configured such that the water passage WL passes through all of the filters A1, A2, B1, and B2 prepared as the filter 31. As described above, by changing the configuration of the filter 31 used in the shower booth 5 for men and the shower booth 5 for women, drainage water can be efficiently purified. As a result, it is possible to delay the replacement time of the filter 31 or to extend the lifespan of the filter 31.

Second Embodiment (System Configuration)

Figure 16:
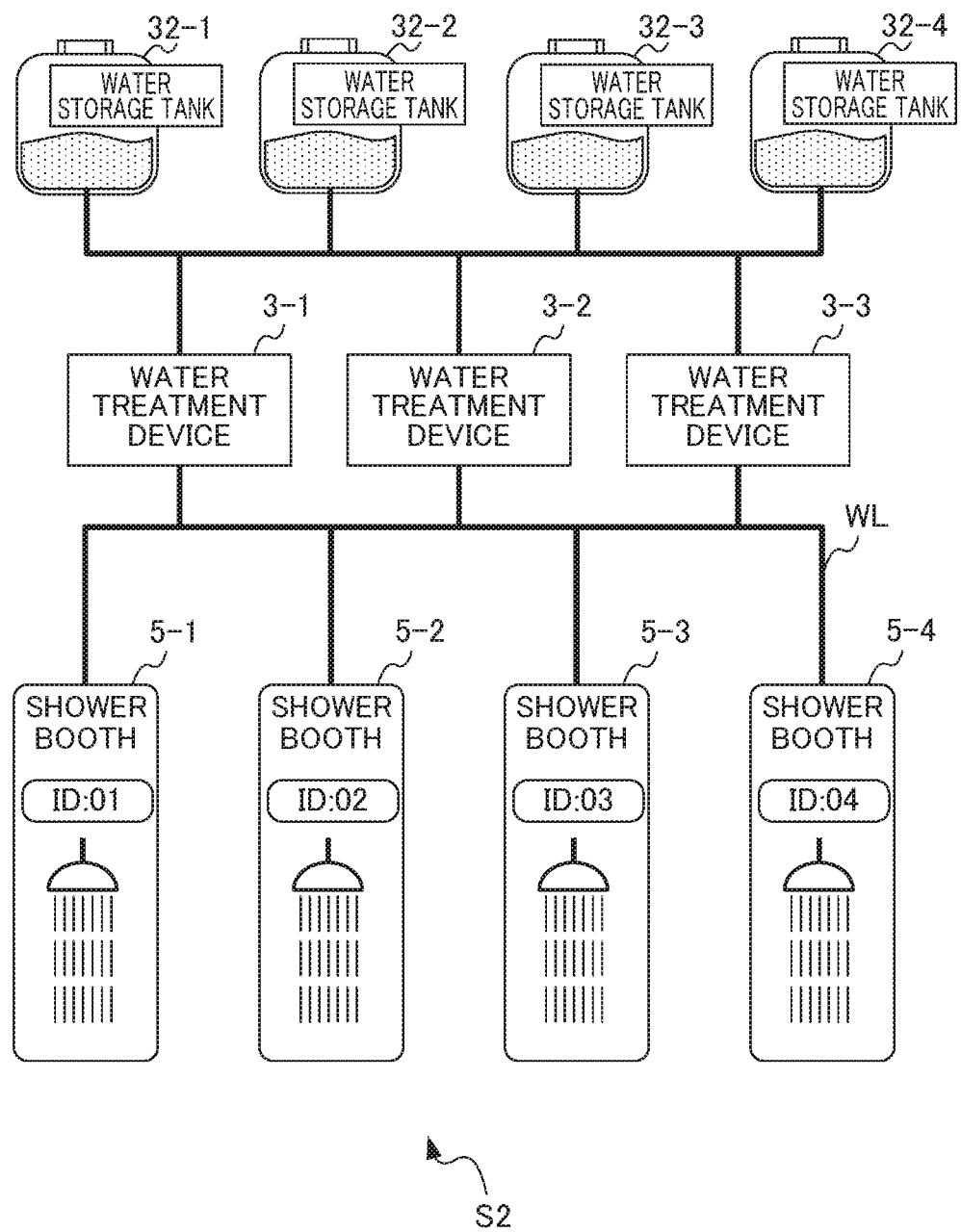
FIG. 16 is a diagram illustrating a part of the configuration of a water circulation management system according to a second embodiment of the present invention.

FIG. 16 is a diagram illustrating a part of the configuration of a water circulation management system S2 according to a second embodiment of the present invention.

In the water circulation management system S2 according to the second embodiment of the present invention, unlike in the first embodiment, the water storage tank 33 is provided separately from the water treatment device 3. Specifically, four water storage tanks 33-1 to 33-4 are provided separately from three water treatment devices 3-1 to 3-3. In addition, although not illustrated, the water circulation management system S2 is configured to include treated water sensors 4C-1 to 4C-4, drainage water sensors 4D-1 to 4D-4, and shower booths 5-1 to 5-4 similar to the water circulation management system S1 illustrated in FIG. 1.

The water circulation management system S2 illustrated in FIG. 16 has a configuration in which a plurality of shower booths 5-1 to 5-4 are connected to a plurality of water treatment devices 3-1 to 3-3 in series, in parallel, or in a combination of series and parallel by piping. The server 1 detects the use status of each of the shower booths 5-1 to 5-4 based on the sensing results of the treated water sensors 4C-1 to 4C-4 and the drainage water sensors 4D-1 to 4D-4 attached to the water passage WL or the valve 52. As illustrated in FIG. 16, since the water circulation management system S2 includes a plurality of water treatment devices 3-1 to 3-3 and a plurality of water storage tanks 33-1 to 33-4 separated from the water treatment device 3, it is possible to prepare a large amount of treated water and to treat a large amount of drainage water. Therefore, even if a larger number of shower booths 5 are included in the water circulation management system S2 as well as the shower booths 5-1 to 5-4, it is possible to realize stable supply of treated water. As a result, the shower booth 5 can be installed in a place where many people are expected to use the shower booth 5, for example, a camping site, an event site, an evacuation site in the event of a disaster, a trailer house, and a beach.

Third Embodiment (System Configuration)

FIG. 17 is a diagram illustrating the configuration of a water circulation management system S3 according to a third embodiment of the present invention.

In the first and second embodiments, a method of controlling a plurality of shower booths as an example of the water treatment device has been described. However, as described above, the water treatment device as the utilization unit in the present invention is not limited to the shower booth, and is a concept including any device having a function of using and draining water. In addition, there is also a demand for efficiently sharing a plurality of types of water treatment devices including a shower booth. Unlike in the first and second embodiments described above, the water circulation management system S3 according to the third embodiment of the present invention includes four water treatment devices as the utilization unit in the present invention. Specifically, a dish washer and dryer (hereinafter, a "dishwasher") 5-1, a washing machine 5-2, a toilet 5-3, and a shower booth 5-4 are provided as the four water treatment devices.

The server 1 detects the use status of each of the dishwasher 5-1, the washing machine 5-2, the toilet 5-3, and the shower booth 5-4 based on the sensing results of the treated water sensors 4C-1 to 4C-4 and the drainage water sensors 4D-1 to 4D-4 attached to the water passage WL or valves 52-1 to 52-4. Then, the server 1 controls the input of treated water to each of the dishwasher 5-1, the washing machine 5-2, the toilet 5-3, and the shower booth 5-4.

The treated sensor 4C is attached to, for example, the following location to perform sensing. That is, in the water treatment device 3, the treated sensor 4C (not illustrated) attached to the inside of the drainage water treatment tank 32 and the water storage tank 33 and the inflow portion of treated water senses the amount of water, temperature, flow rate, and pressure of treated water. In the dishwasher 5-1, the treated sensor 4C-1 attached to the faucet, the inflow portion of treated water, and the pipe connected to the sink of the kitchen senses the flow rate and the pressure of the treated water. In the washing machine 5-2, the treated sensor 4C-2 attached to the inflow portion of treated water and the pipe connected to the washing machine 5-2 senses the flow rate and the pressure of the treated water. In the toilet 5-3, the treated sensor 4C-3 attached to the inflow portion of treated water, the toilet tank, and a portion at which toilet washing water flows out of the toilet tank, senses the amount of water, flow rate, pressure, and temperature of the treated water. In the shower booth 5-4, the treated sensor 4C-4 attached to the valve 52-4, the shower head 53-4, and the connection pipe of the shower senses the flow rate, pressure, and temperature of the treated water.

In addition, the drainage water sensor 4D is attached to, for example, the following location to perform sensing. That is, in the water treatment device 3, the drainage water sensor 4D (not illustrated) attached to the inside of the drainage water treatment tank 32 and the water storage tank 33 and the outflow portion of drainage water senses the amount of water, temperature, flow rate, and pressure of the drainage water. In the dishwasher 5-1, the drainage water sensor 4D-1 attached to the drain in the sink of the kitchen, the outflow portion of treated water, and the pipe connected to the drain in the sink of the kitchen senses the flow rate, pressure, electrical conductivity, temperature, viscosity, pH, water quality, and the like of the drainage water. In the washing machine 5-2, the drainage water sensor 4D-2 attached to the drainage water hose for the washing machine, the drain, and the pipe connected to the drain senses the flow rate, pressure, electrical conductivity, and temperature of the drainage water. In the toilet 5-3, the drainage water sensor 4D-4 attached to the drain and the pipe connected to the drain senses the flow rate, pressure, electrical conductivity, temperature, pH, water quality, and the like of the drainage water. In the shower booth 5-4, the drainage water sensor 4D-4 attached to the drain and the pipe connected to the drain senses the flow rate, pressure, temperature, pH, electrical conductivity, and water quality of the drainage water.

Therefore, it is possible to provide a water circulation management system by which it is possible to efficiently share a plurality of water utilization devices (a dishwasher, a washing machine, a toilet, and a shower booth) including a shower booth. Specifically, for example, the following sharing is possible. That is, when the water circulation management system is shared between the dishwasher 5-1 and the shower booth 5-4, the flow rate, pressure, and temperature of treated water used in the shower booth 5-4 are sensed to sense the flow rate, pressure, and temperature of treated water used in the dishwasher 5-1. In addition, the amount of water, flow rate, pressure, and temperature of treated water stored in the water storage tank 33 of the water treatment device 3 are sensed, and the temperature, flow rate, and pressure that are optimal for use by the user U are fed back to the pumps 51-1 and 51-4 and a heater (not illustrated). In addition, by measuring the temperature or the water quality of drainage water using the drainage water sensors 4D-1 and 4D-4, it is possible to estimate the time until the next use. In addition, the filter 31 to be used is switched according to the water quality (for example, the amount of contamination). In this case, the surplus water storage tank amount is measured by a water amount sensor, and the amount of water to be used is distributed.

Further, for example, the following sharing is possible. That is, when the water circulation management system is shared by the dishwasher 5-1, the washing machine 5-2, the toilet 5-3, and the shower booth 5-4, the use status of the dishwasher 5-1 is sensed by sensing the flow rate, pressure, and temperature of treated water used in the dishwasher 5-1. In addition, the use state of the washing machine 5-2 is sensed by sensing the flow rate, pressure, and temperature of the treated water used in the washing machine 5-2. In addition, the use status of the toilet 5-3 is sensed by sensing the flow rate, pressure, and temperature of treated water used in the toilet 5-3. In addition, the use state of the shower booth 5-4 is sensed by sensing the flow rate, pressure, and temperature of treated water used in the shower booth 5-4. As a result, the temperature, flow rate, and pressure that are optimal for use by the user U are fed back to the pumps 51-1 and 51-4 and a heater (not illustrated). In addition, by measuring the temperature or the water quality of drainage water using the drainage water sensors 4D-1 and 4D-4, it is possible to estimate the time until the next use. In addition, the filter 31 to be used is switched according to the water quality (for example, the amount of contamination). In this case, the surplus water storage tank amount is measured by a water amount sensor, and the amount of water to be used is distributed.

FIG. 18 is a diagram illustrating a specific example of a screen that is displayed on the user terminal 2 in real time and shows the status of each of the dishwasher 5-1, the washing machine 5-2, the toilet 5-3, and the shower booth 5-4 as water utilization devices. As illustrated in FIG. 18, icons indicating the dishwasher 5-1, the washing machine 5-2, the toilet 5-3, and the shower booth 5-4 as water utilization devices are displayed on the user terminal 2.

Figure 18A:
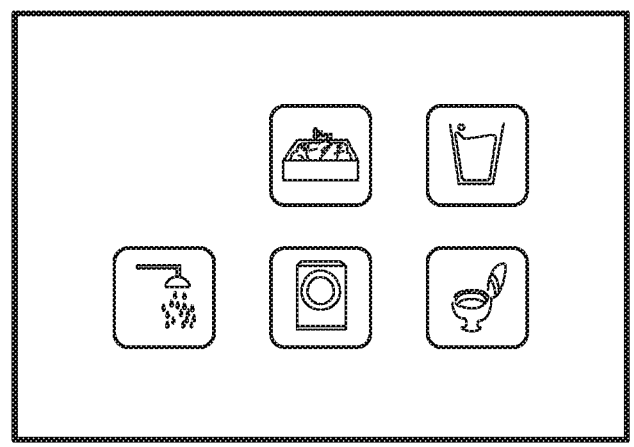
FIG. 18A is a screen showing a state in which use by a user is possible.

The screen illustrated in FIG. 18A is a screen showing a state in which use by the user U is possible (hereinafter, referred to as an "available state"). In other words, the state illustrated in FIG. 18A shows a state in which the user U has not yet started using the dishwasher 5-1, the washing machine 5-2, the toilet 5-3, and the shower booth 5-4 as water utilization devices.

Figure 18B:
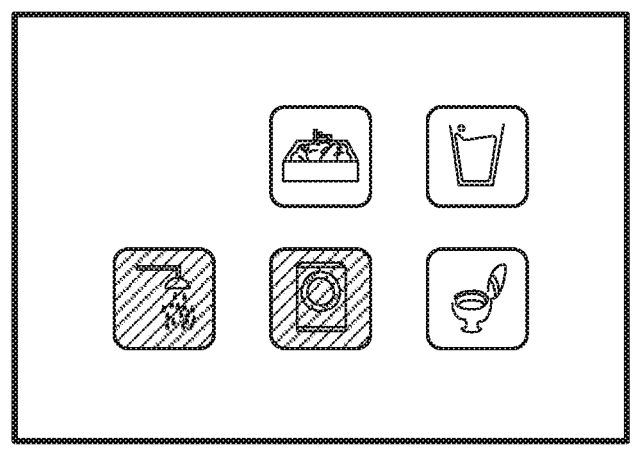
FIG. 18B is a screen showing a state of "in-use" by a user.

The screen illustrated in FIG. 18B is a screen showing a state of "in-use" by the user U. That is, as illustrated in FIG. 18B, the colors of two icons are different from the colors of the icons illustrated in FIG. 18A. This shows a state in which the user U has started using the washing machine 5-2 and the shower booth 5-4.

Figure 18C:
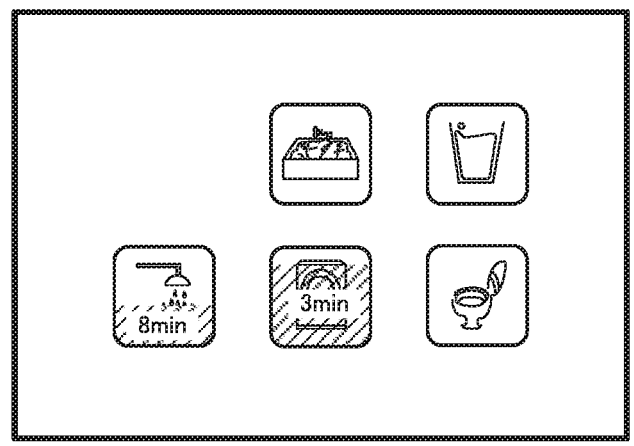
FIG. 18C is a screen showing a state during water treatment.

The screen illustrated in FIG. 18C is a screen showing a state during water treatment. As illustrated in FIG. 18C, the remaining time until the available state is displayed in the two icons. Specifically, the icon arranged at the lower left indicates that the remaining time is "8 minutes" until the shower booth 5-4 becomes available. The color of the icon arranged at the lower center is different from that of the screen illustrated in FIG. 18A. This indicates that the remaining time is "3 minutes" until the washing machine 5-2 becomes available.

Fourth Embodiment (System Configuration)

FIG. 19 is a diagram illustrating the configuration of a water circulation management system S4 according to a fourth embodiment of the present invention.

The water circulation management system S4 according to the fourth embodiment of the present invention is configured to include a plurality of water treatment devices 3 unlike in the third embodiment described above. Specifically, this configuration is obtained by further providing two water treatment devices 3-2 and 3-3 in the configuration of the water circulation management system S4 illustrated in FIG. 17. As a result, the number of water utilization devices (4) and the number of water treatment devices 3 (4) are in a one-to-one relationship. In this manner, it is possible to prepare treated water individually for each of the water utilization devices 5-1 to 5-4 and to treat a large amount of drainage water. As a result, it is possible to realize the stable supply of treated water to each water utilization device 5. As a result, the shower booth 5 can be installed in a place where many people are expected to use the shower booth 5, for example, an evacuation site, an event site, and a beach.

Although one embodiment of the present invention has been described above, the present invention is not limited to the above-described embodiment, and modifications, improvements, and the like within a range where the object of the present invention can be achieved are included in the present invention.

For example, in the embodiment described above, the number of water utilization devices, such as the shower booths 5, is a total of four. However, this is merely an example, and the number of water utilization devices may be five or more.

In addition, for example, in the embodiments described above, the water utilization device includes a dishwasher, a washing machine, a toilet, and a shower booth, but this is merely an example. Any device having a function of using and draining water can be adopted as a water utilization device.

In addition, for example, in the embodiments described above, the operation by the user U is performed on the user terminal 2, but the present invention is not limited thereto. The operation may be performed on the touch panel 54 provided in the shower booth 5. That is, the screens illustrated in FIGS. 5, 7, 8 to 12 described above can be displayed by activating the application program installed on the user terminal 2 or can be displayed on the touch panel 54 provided in the shower booth 5.

In addition, for example, in the embodiments described above, an example has been mentioned in which the configuration of the filter 31 determined by the determination unit 104 is different between the shower booth 5 for men and the shower booth 5 for women, but this is merely an example. For example, it is possible to evaluate the water quality of drainage water by monitoring the drainage water based on the water use information and determine the configuration of the filter 31 or the water passage WL according to the degree of contamination of the drainage water. In addition, the lifespan of the filter 31 can be predicted. Therefore, it is possible to minimize the environmental load or the load received by the filter 31. In addition, when the water treatment device 3 is used in a scene in which the water treatment device 3 has not been used in the past, a situation close to the environment in which the water treatment device 3 is actually placed can be assumed based on the water use information, and the configuration of the filter suitable for drainage water treatment can be determined. Specifically, the configuration of a filter suitable for drainage water treatment can be determined based on, for example, climate, geographic information, and lifestyle obtained from the water use information. In this manner, it is possible to determine the configuration of the filter corresponding to all scenes, for example, camping in the forest, office, running event in India, and camping in the mountains. The filter configuration determined in this manner is stored in the water use DB 402 together with the result, so that the determination unit 104 can continue learning for the future and determine a more suitable filter configuration.

In addition, for example, in the embodiments described above, predetermined sensors are adopted as the treatment water sensor 4C and the drainage water sensor 4D, but the present invention is not limited thereto. The server 1 may be configured to be able to propose which sensor among various kinds of sensors is to be adopted based on the water use information.

In addition, for example, in the embodiments described above, the water input to the utilization unit, such as a shower, is water output from the water treatment unit for performing water treatment, such as purification, on the drainage water output from the utilization unit. That is, in the embodiments described above, a water circulation treatment system is adopted. However, adopting the water circulation treatment system is not particularly essential. For example, in a case where a water treatment system including one or more utilization units for outputting the water as drainage water when the input water is used by a user and one or more water treatment units capable of performing predetermined water treatment on at least a part of the drainage water output from the one or more utilization units is adopted, the water input to the utilization unit may be water output from the water treatment unit or may be water supplied from the others. In other words, the water output from the water treatment unit may be used for the utilization unit or may be used for something other than the utilization unit.

In addition, in the embodiments described above, the explanation has been given on the assumption that the shower booths 5-1 to 5-4, the server 1, the user terminal 2, the water treatment device 3, and the treated water sensor 4 are connected to each other through the network N, such as the Internet. A supplementary explanation regarding this will be briefly given. That is, specifically, for example, the shower booths 5-1 to 5-4 may communicate with each other using the Internet, short-range wireless communication, or the like, or the shower booths 5-1 to 5-4 may directly communicate with the server 1, a cloud, or the like without using the user terminal 2 or the like.

In addition, in the embodiments (mainly, FIG. 18) described above, the explanation has been given on the assumption that various devices (for example, the dishwasher 5-1 and the like) relevant to the utilization unit are connected to the server 1 in advance. However, the server 1 does not need to know in advance various devices relevant to the utilization unit connected to itself. That is, the server 1 may automatically determine the connection status of various devices relevant to the utilization unit from the sensing result of the sensor 4C or the sensor 4D. Then, the server 1 does not need to acquire the connection status of various devices relevant to the utilization unit in advance. Accordingly, even if such information cannot be acquired, it is possible to execute processing based on the connection status of various devices relevant to the utilization unit. Furthermore, the result of such a connection state can be reflected in the icon display method illustrated in FIG. 18 and the like. That is, for example, although not illustrated, icons A, B, and C may be displayed below the icons, and only the icon C may be displayed brightly and the icons A and B may be displayed darkly when only the device corresponding to C is connected and when A and B are not connected.

In addition, for example, the above-described series of processes can be executed by hardware or can be executed by software. In other words, the functional configuration illustrated in FIG. 4 is merely an example, and is not particularly limited. That is, it is sufficient that the information processing system has a function capable of executing the above-described series of processes as a whole, and what kind of functional block is to be used to realize this function is not particularly limited to the example illustrated in FIG. 4. In addition, the location of the functional block is not particularly limited to FIG. 4 and may be arbitrary. In addition, one functional block may be configured by hardware alone, or may be configured by software alone, or may be configured by a combination thereof.

In addition, for example, when a series of processes are executed by software, a program configuring the software is installed on a computer or the like through a network or a recording medium. The computer may be a computer embedded in dedicated hardware. In addition, the computer may be a computer that can execute various functions by installing various programs, for example, not only a server but also a general-purpose smartphone or a personal computer.

In addition, for example, a recording medium containing such a program is not only a removable medium (not illustrated) distributed separately from the apparatus main body in order to provide the user with the program but also a recording medium provided to the user in a state in which the recording medium is built into the apparatus main body in advance.

In addition, in this specification, steps for describing a program recorded on a recording medium include not only processing performed on a time-series basis according to the order but also processing that is performed in parallel or individually even if the processing is not necessarily performed on a time-series basis. In addition, in the present specification, the term "system" means an entire apparatus including a plurality of devices or a plurality of units.

In summary, a water circulation management system to which the present invention is applied only needs to have the following configuration, and it is possible to take various embodiments. That is, the water treatment system to which the present invention is applied (for example, the water circulation treatment system S1 illustrated in FIG. 1) is a water treatment system including one or more utilization units (for example, the shower booths 5-1 to 5-4 illustrated in FIG. 1) for outputting used water as drainage water when input water is used by a user (for example, the user U illustrated in FIG. 1), and includes: one or more detection units (for example, the treated water sensor 4C and the drainage water sensor 4D illustrated in FIG. 1) capable of detecting a given physical amount, which is relevant to at least a part of the water input to each of information processing devices whose control target is the one or more utilization units and the drainage water output from each of the one or more utilization units, or an amount based thereon; and an information generation unit (for example, the information generation unit 102 illustrated in FIG. 4) for generating information regarding use of each of the one or more utilization units by the user based on a result (for example, sensing data) of at least a part of the one or more detection units. Therefore, it is possible to provide a water treatment system by which it is possible to efficiently share a plurality of water utilization units.

In addition, one or more water treatment units (for example, the water treatment device 3 illustrated in FIG. 1) capable of performing predetermined water treatment on at least a part of the drainage water output from the one or more utilization units; and a control unit (for example, the input control unit 103 illustrated in FIG. 4) for performing predetermined control on a control target based on a result of each of the one or more detection units, the control target being each of the one or more utilization units and at least a part of the one or more water treatment units can be provided. Therefore, it is possible to provide a water treatment system by which it is possible to use drainage water even in an environment in which it is difficult to secure water.

In addition, the information generation unit can generate water use information including at least one of use start, use stop, use amount, and use time of water by the user in each of the one or more utilization units. Therefore, it is possible to provide a water treatment system by which it is possible to efficiently share a plurality of water utilization units based on the generated water use information.

In addition, the control unit can further control input of the treated water to each of the one or more utilization units, as the predetermined control, based on the generated water use information. Therefore, it is possible to provide a water treatment system by which it is possible to use drainage water even in an environment, in which it is difficult to secure water, based on the generated water use information.

In addition, the information generation unit can generate user use information including at least one of a use status of a user who uses each of the one or more utilization units and a time until a user trying to use the one or more utilization units is able to use the utilization unit. Therefore, it is possible to provide a water treatment system by which it is possible to use drainage water even in an environment, in which it is difficult to secure water, based on the generated user use information.

In addition, the water treatment unit can include one or more purification units, and a determination unit for determining a configuration of the purification unit used for treating drainage water, among the one or more purification units, based on the water use information, can be further provided. Therefore, it is possible to efficiently use the filter 31.

In addition, the utilization unit can include a shower, and the control unit can control pressure of water sprinkled from the shower, as the predetermined control, based on the water use information. Therefore, it is possible to provide a water treatment system by which it is possible to efficiently share a plurality of water utilization units including a shower.

In addition, as the predetermined control, the control unit can further control temperature and amount of water sprinkled from the shower. Therefore, it is possible to provide a water treatment system by which it is possible to efficiently share a shower in which the temperature and the amount of sprinkled water are controlled.

In addition, it is possible to detect a change in one or more electrical signals, which are obtained by driving or stopping of a pump (for example, the pump 51 illustrated in FIG. 1), operation of a shower head (for example, the shower head 53 illustrated in FIG. 1), opening and closing of a shower valve (for example, the valve 52 illustrated in FIG. 1), or at least one sensor (for example, the treated water sensor 4C illustrated in FIG. 1 and the drainage water sensor 4D illustrated in FIG. 1) connected to a pipe (for example, the water passage WL illustrated in FIG. 1) between the shower booths (for example, the shower booths 5-1 to 5-4 illustrated in FIG. 1) and notify the user U of the availability of the shower booth and the time until the shower booth becomes available.

In addition, it is possible to detect one or more electrical signal changes obtained by the operation of the shower head or one sensor connected to a pipe between the shower booths and send a feedback to make the water pressure of the shower constant.

In addition, it is also possible to estimate shower availability or the time until the shower becomes available by detecting opening and closing of a shower valve, at least one sensor, or a change in one or more electrical signals obtained from a sensor built into the water treatment device.

In addition, it is possible to provide an optimal water purification method by switching the filter and the water passage according to the use conditions of the shower.

In addition, it is possible to provide a shower with the constant temperature, amount, or pressure of water all the time by switching or opening and closing the water passage and operating a surplus tank (for example, the water storage tanks 33-1 to 33-4 illustrated in FIG. 16) according to the use status of the shower, the operation status of the device, and the status of the water storage.

EXPLANATION OF REFERENCE NUMERALS

1: server, 2, 2-1 to 2-*n*: user terminal, 3, 3-1 to 3-4: water treatment device, 4C, 4C-1 to 4C-4: treated water sensor, 4D, 4D-1 to 4D-4: drainage water sensor, 5, 5-1 to 5-4: water utilization device (shower booth, dishwasher, washing machine, toilet), 11: CPU, 12: ROM, 13: RAM, 14: bus, 15: input and output interface, 16: output unit, 17: input unit, 18: storage unit, 19: communication unit, 20: drive, 30: removable medium, 31: filter, 32: drainage water treatment tank, 33, 33-1 to 33-4: water storage tank, 51, 51-1 to 51-4: pump, 52, 52-1 to 52-4: valve, 53, 53-1 to 53-4: shower head, 54, 54-1 to 54-4: touch panel, 101: acquisition unit, 102: information generation unit, 103: input control unit, 104: determination unit, 401: sensing DB, 402: water use DB, 403: user use DB, A1, A2: filter A, B1, B2: filter B, F1, F11, F21 to F23, F31, F32, F41, F42, F51, F61, F71 to F74: display area, B31, B41, B511, B512: button, S1, S2, S3: water circulation management system, U, U1 to Un: user, WL: water passage, N: network, W1 to W3: line on graph

The invention claimed is:
1. A water treatment system including one or more water utilization units for outputting used water as drainage water when input water is used by a user, comprising:
a server including a communication unit, the server further includes a processor coupled to a storage unit that stores various kinds of data, the processor includes a determination unit;
an information processing device that functions as a user terminal, which is movable by the user and displays an operation screen to control the one or more water utilization units via communication;
one or more detection units which includes a water sensor that senses a water input to each of the one or more water utilization units and a drainage water sensor that senses a drainage water output from each of the one or more water utilization units, the one or more detection units capable of detecting a given physical amount which is relevant to at least a part of the water input and the drainage water, or an amount based on the given physical amount;

an acquisition unit provided in the processor of the server that acquires sensing data based on detection by the one or more detection units;

an information generation unit provided in the processor of the server, for generating water use information including at least one of, use start, use stop, use amount, and use time of use of water regarding use of each of the one or more water utilization units by the user based on a result of at least a part of the one or more detection units;

one or more water treatment units each including purification units configured with a plurality of filters of same type or different types from each other capable of performing predetermined water treatment on at least a part of the drainage water output from the one or more water utilization units;

an input control unit provided in the processor of the server, for performing predetermined control on a control target based on a result of each of the one or more detection units and the water use information, the control target being each of the one or more water utilization units and a configuration of the plurality of filters of the one or more water treatment units, wherein the water treatment system further comprises databases provided in the storage unit, at least including a user use DB, a water use DB, and a sensing DB, in the user use DB, user use information displayed on the information processing device is managed based on at least a part of the results obtained by the one or more detection units, in the water use DB, the water use information related to water treatment in the one or more water treatment units is managed, and in the sensing DB, the sensing data is stored and managed, wherein the information generation unit further generates information on at least water pollution degree of the drainage water as the water use information, and the input control unit controls input of water through the predetermined water treatment to each of the one or more water utilization units, as the predetermined control, based on the water use information generated by the information generation unit.

2. The water treatment system according to claim 1, wherein the user use information includes at least one of a use status of a user who uses each of the one or more water utilization units and a time until a user trying to use the one or more water utilization units is able to use the one or more water utilization units.

3. The water treatment system according to claim 1, wherein the one or more water utilization unit are selected from a shower booth, a sink of a kitchen, a dish washer and dryer, a toilet, and a washing machine, and the input control unit further controls pressure of water from the water utilization unit, as the predetermined control, based on the water use information.

4. The water treatment system according to claim 3, wherein the input control unit further controls temperature and amount of water from the water utilization unit as the predetermined control.

5. The water treatment system according to claim 1, wherein the input control unit further controls quality of water from the water utilization unit, as the predetermined control, based on the water use information.

6. The water treatment system according to claim 1, wherein the information processing device displays a replacement life of each of the plurality of filters.

7. The water treatment system according to claim 1, wherein a pump and a valve that controls passage of water are provided in each of the one or more water utilization units, and an identification information for uniquely identifying a corresponding pump is displayed by the information processing device and cooperates with the water use information.

\* \* \* \* \*